(12) United States Patent
Kim et al.

(10) Patent No.: US 11,889,203 B2
(45) Date of Patent: Jan. 30, 2024

(54) CAMERA MODULE

(71) Applicant: LG INNOTEK CO., LTD., Seoul (KR)

(72) Inventors: Seok Hyen Kim, Seoul (KR); Hyo Seon Yoon, Seoul (KR); Eun Song Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 74 days.

(21) Appl. No.: 16/971,263

(22) PCT Filed: Feb. 21, 2019

(86) PCT No.: PCT/KR2019/002132
§ 371 (c)(1),
(2) Date: Aug. 19, 2020

(87) PCT Pub. No.: WO2019/164298
PCT Pub. Date: Aug. 29, 2019

(65) Prior Publication Data
US 2021/0014416 A1 Jan. 14, 2021

(30) Foreign Application Priority Data
Feb. 23, 2018 (KR) .......... 10-2018-0022127

(51) Int. Cl.
H04N 23/951 (2023.01)
G02B 7/00 (2021.01)
(Continued)

(52) U.S. Cl.
CPC ........... *H04N 23/951* (2023.01); *G02B 7/006* (2013.01); *G02B 7/021* (2013.01); *H04N 23/55* (2023.01)

(58) Field of Classification Search
CPC ..... H04N 23/698; H04N 23/951; H04N 25/48
(Continued)

(56) References Cited

U.S. PATENT DOCUMENTS 6,242,850 B1 * 6/2001 Slutskiy ................. H02N 2/002
6,445,515 B2   9/2002 Moennig
(Continued)

FOREIGN PATENT DOCUMENTS

CN   101247489 A   8/2008
CN   103093444 A   5/2013
(Continued)

OTHER PUBLICATIONS

Office Action dated Nov. 9, 2021 in European Application No. 19 756 502.1.
(Continued)

*Primary Examiner* — Anthony J Daniels
(74) *Attorney, Agent, or Firm* — Saliwanchik, Lloyd & Eisenschenk

(57) ABSTRACT

A camera module includes an image sensor configured to output a plurality of image frames, a lens assembly disposed on the image sensor, the lens assembly including at least one lens unit disposed on an optical path and a variable filter unit configured to adjust the optical path of light incident on the image sensor from outside, a controller configured to generate a control signal to control the variable filter unit, and an image synthesizer configured to synthesize the plurality of image frames to generate a composite image, wherein the composite image has a higher resolution than the image frames, and wherein the plurality of image frames includes image frames generated along respectively different optical paths changed by the variable filter unit.

18 Claims, 23 Drawing Sheets

(51) Int. Cl.
  G02B 7/02 (2021.01)
  H04N 23/55 (2023.01)
(58) Field of Classification Search
  USPC .......................................................... 348/374
  See application file for complete search history.

(56) References Cited

U.S. PATENT DOCUMENTS

| | | | |
|---|---|---|---|
| 9,578,218 B2 | 2/2017 | Topliss | |
| 2002/0097324 A1 | 7/2002 | Onuki | |
| 2003/0168942 A1 | 9/2003 | Iino et al. | |
| 2005/0225646 A1* | 10/2005 | Shintani | H04N 5/2254 348/208.99 |
| 2005/0248661 A1* | 11/2005 | Stanvely | H04N 23/6812 348/208.99 |
| 2007/0132857 A1 | 6/2007 | Grip et al. | |
| 2009/0261688 A1 | 10/2009 | Xie et al. | |
| 2011/0075021 A1 | 3/2011 | Chang | |
| 2013/0250169 A1 | 9/2013 | Kim | |
| 2013/0293772 A1* | 11/2013 | Kim | H04N 5/23264 348/374 |
| 2016/0182786 A1 | 6/2016 | Anderson et al. | |
| 2016/0212332 A1* | 7/2016 | Tang | H04N 5/349 |
| 2016/0293764 A1 | 10/2016 | Ban et al. | |
| 2016/0306146 A1 | 10/2016 | Kim | |
| 2017/0160540 A1 | 6/2017 | Giusti et al. | |

FOREIGN PATENT DOCUMENTS

| | | | | |
|---|---|---|---|---|
| CN | 103389609 A | | 11/2013 | |
| CN | 105308949 A | | 2/2016 | |
| EP | 0 804 039 A1 | | 10/1997 | |
| EP | 2 722 656 A1 | | 4/2014 | |
| JP | 2005-318511 A | | 11/2005 | |
| JP | 2008-40240 A | | 2/2008 | |
| JP | 2010-122183 A | | 6/2010 | |
| KR | 10-2013-0124670 A | | 11/2013 | |
| KR | 10-2014-0106317 A | | 9/2014 | |
| KR | 10-20200085578 A | * | 7/2020 | ............ H04N 5/349 |
| WO | 2013/136053 A1 | | 9/2013 | |
| WO | WO-2017/149092 A2 | | 9/2017 | |
| WO | 2018/002923 A2 | | 1/2018 | |

OTHER PUBLICATIONS

Office Action dated Sep. 22, 2021 in Chinese Application No. 201980027365.4.
Supplementary European Search Report dated Nov. 26, 2020 in European Application No. 19756502.1.
International Search Report in International Application No. PCT/KR2019/002132, filed Feb. 21, 2019.
Office Action dated Apr. 13, 2022 in Korean Application No. 10-2018-0022127.
Notice of Allowance dated Jul. 16, 2023 in Chinese Application No. 201980027365.4.
Zhen, H. et al., "Motion Vector Composition Algorithm Based on Accuracy for Reduced Spatial Resolution Video Transcoding," Journal of Image and Graphics, Jan. 2010, 15(1): 7-14.

* cited by examiner

CAMERA MODULE

CROSS-REFERENCE TO RELATED APPLICATIONS

This application is the U.S. national stage application of International Patent Application No. PCT/KR2019/002132, filed Feb. 21, 2019, which claims the benefit under 35 U.S.C. § 119 of Korean Application No. 10-2018-0022127, filed Feb. 23, 2018, the disclosures of each of which are incorporated herein by reference in their entirety.

TECHNICAL FIELD

Embodiments relate to a camera module.

BACKGROUND ART

People who use portable devices demand optical devices that have high resolution, are small, and have various photographing functions (an optical zoom-in/zoom-out function, an auto-focusing (AF) function, a hand-tremor compensation or optical image stabilizer (OIS) function, etc.). Such photographing functions may be realized by directly moving a plurality of lenses that are combined. In the case in which the number of lenses is increased, however, the size of an optical device may increase.

The auto-focusing and hand-tremor compensation functions are performed by moving or tilting a plurality of lens modules, which are fixed to a lens holder in the state in which the optical axes thereof are aligned, along an optical axis or in a direction perpendicular to the optical axis, and a separate lens moving apparatus is used to move the lens modules. However, the lens moving apparatus has high power consumption, and an additional cover glass needs to be provided separately from the camera module in order to protect the lens moving apparatus, thus leading to an increase in the overall thickness of a device.

Further, with increasing user demand for a high-quality image, an image sensor capable of capturing a high-resolution image is required. To this end, however, the number of pixels included in an image sensor is inevitably increased, which may result in an increase in the size of the image sensor and increased power consumption.

That is, since a conventional camera module uses a plurality of arrays of data as they are, it has limitations in that a resolution thereof is determined by the physical resolution of an image sensor. In addition, there are limitations in that a plurality of cameras needs to be used in order to generate a super-resolution image.

DISCLOSURE

Technical Problem

Embodiments provide a camera module and an optical device capable of generating a super-resolution image without increasing the number of pixels.

The objects to be accomplished by the disclosure are not limited to the above-mentioned objects, and other objects not mentioned herein will be clearly understood by those skilled in the art from the following description.

Technical Solution

A camera module according to an embodiment may include an image sensor configured to output a plurality of image frames, a lens assembly disposed on the image sensor, the lens assembly including at least one lens unit disposed on an optical path and a variable filter unit configured to adjust the optical path of light incident on the image sensor from the outside, a controller configured to generate a control signal to control the variable filter unit, and an image synthesizer configured to synthesize the plurality of image frames to generate a composite image. The composite image may have a higher resolution than the image frames, and the plurality of image frames may include image frames generated along respectively different optical paths changed by the variable filter unit.

For example, the variable filter unit may include a filter configured to filter light within a predetermined wavelength range and an actuator configured to adjust an angle of the filter with respect to an optical axis of the lens unit in response to the control signal.

For example, the variable filter unit may further include a support member disposed on the lens unit to support the filter and the actuator.

For example, the at least one lens unit may include a plurality of lens units, and the variable filter unit may further include a support member disposed between the plurality of lens units to support the filter and the actuator.

For example, the camera module may further include a main board on which the image sensor is disposed, and the lens assembly may further include a holder configured to accommodate and support the at least one lens unit.

For example, the variable filter unit may further include a support member disposed under the lens unit in the holder in order to support the filter and the actuator.

For example, the variable filter unit may further include a support member disposed around the image sensor on the main board in order to support the filter and the actuator.

For example, the actuator may include a piezoelectric element, MEMS, a shape memory alloy wire, a voice coil motor, or a liquid lens.

For example, the actuator may include a plurality of first piezoelectric elements disposed on respective corners of the filter and configured to operate independently of each other.

For example, the actuator may include a plurality of second piezoelectric elements disposed closer to a tilting axis of the filter than to corners of the filter while being spaced apart from each other and configured to operate independently of each other.

For example, the actuator may include a third piezoelectric element disposed on a first edge of the filter and a fourth piezoelectric element disposed on a second edge of the filter, which is opposite the first edge. The third and fourth piezoelectric elements may operate independently of each other.

For example, the plurality of image frames may include a first image frame and a second image frame, and the second image frame may be an image frame shifted by a first interval on the basis of the first image frame.

For example, the image sensor may generate one of the plurality of image frames, may receive a feedback signal indicating that the optical path has been adjusted by tilting of the variable filter unit, and may generate another one of the plurality of image frames.

For example, the controller may receive a signal indicating completion of generation of one of the plurality of image frames, and may transmit the control signal to the variable filter unit to adjust the optical path.

For example, the image sensor may include a first region and a second region, and the controller may output a first path control signal as the control signal to control the variable filter unit such that an optical path of light, incident from the outside and passing through the variable filter unit, is changed from the first region to the second region of the image sensor.

For example, the image sensor may further include a third region and a fourth region, and the controller may output a second path control signal as the control signal to control the variable filter unit such that the optical path is changed from the second region to the third region, and outputs a third path control signal as the control signal to control the variable filter unit such that the optical path is changed from the third region to the fourth region.

For example, the control signal may include a signal for changing the field of view (FOV) of the lens assembly in a first direction, a signal for changing the FOV of the lens assembly in a second direction, a signal for changing the FOV of the lens assembly in a third direction, and a signal for changing the FOV of the lens assembly in a fourth direction.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of the device according to the present disclosure will be described below.

In a camera module according to an embodiment of the present disclosure, high computational complexity required to obtain a super-resolution image may be solved by a hardware-based method of changing an optical path by tilting a filter, without increasing the number of pixels or using a plurality of cameras. That is, since a plurality of arrays of data shifted by a half (0.5 PD) of a pixel distance (PD) is used, an image having a super resolution higher than the physical resolution of an image sensor may be obtained.

The effects achievable through the disclosure are not limited to the above-mentioned effects, and other effects not mentioned herein will be clearly understood by those skilled in the art from the following description.

BEST MODE

Figure 1:
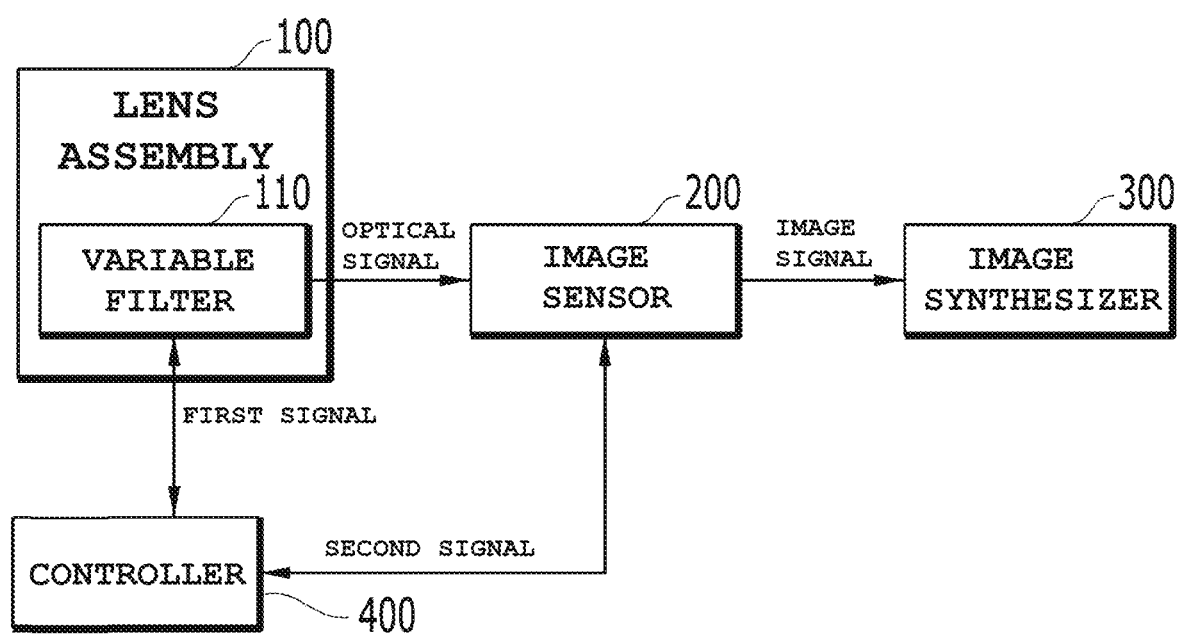
FIG. 1 is a block diagram illustrating a camera module according to an embodiment.

Hereinafter, exemplary embodiments will be described in detail with reference to the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under another element or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

A camera module 10 (10A to 10D) according to embodiments will be described using the Cartesian coordinate system. However, other coordinate systems may be used. In the Cartesian coordinate system, an x-axis, a y-axis, and a z-axis are perpendicular to each other, but embodiments are not limited thereto. That is, the x-axis, the y-axis, and the z-axis may intersect each other obliquely.

Hereinafter, a camera module 10 according to an embodiment will be described with reference to the accompanying drawings.

FIG. 1 is a block diagram illustrating a camera module 10 according to an embodiment.

Referring to FIG. 1, the camera module 10 may include a lens assembly 100, an image sensor 200, an image synthesizer 300, and a controller 400.

The lens assembly 100 may be disposed on the image sensor 200, and may transmit light incident thereon from the outside of the camera module 10 to the image sensor 200. The lens assembly 100 may include at least one lens unit disposed along an optical path and a variable filter unit 110.

The at least one lens unit included in the lens unit of the lens assembly 100 may form one optical system, and may be aligned along the optical axis of the image sensor 200. Here, the lens included in the lens unit may be a liquid lens or a solid lens, or may include both a liquid lens and a solid lens.

The variable filter unit 110 may adjust (or change) the optical path of the lens assembly 100 under the control of the controller 400. The variable filter unit 110 may change the path of light incident on the image sensor 200 from the outside, and may change, for example, the angle of a field of view (FOV) or the direction of the FOV of an optical signal.

According to an embodiment, the variable filter unit 110 may include a filter and an actuator (or a transducer).

The filter may filter light within a predetermined wavelength range. For example, the filter may be an infrared filter that filters light in an infrared (IR) wavelength band, that is, transmits or blocks IR light. For example, the filter may be implemented as an IR glass.

The actuator may be coupled to the filter, and may adjust at least one of whether to tilt the filter or the degree of tilting of the filter in response to a control signal output from the controller 400. That is, the actuator may tilt the filter disposed on a plane perpendicular to the optical axis, thereby changing the path of light incident on a pixel array of the image sensor 200.

The image sensor 200 may include a pixel array configured to receive light, having passed through the lens assembly 100, and to convert the light into an electrical signal corresponding thereto, a driving circuit configured to drive a plurality of pixels included in the pixel array, and a readout circuit configured to read an analog pixel signal of each pixel. The readout circuit may compare the analog pixel signal with a reference signal, and may generate a digital pixel signal (or an image signal) through analog-to-digital conversion. Here, the digital pixel signal of each of the pixels included in the pixel array constitutes an image signal, and the image signal may be transmitted in a frame unit and thus may be defined as an image frame. That is, the image sensor may output a plurality of image frames.

The image synthesizer 300 may be an image processor that receives an image signal from the image sensor 200 and processes the image signal (e.g. interpolation, frame synthesis, etc.). In particular, the image synthesizer 300 may generate an image signal of one frame (high resolution) by synthesizing image signals of a plurality of frames (low resolution). That is, the image synthesizer 300 synthesizes a plurality of image frames included in an image signal received from the image sensor 200, and generates a composite image using the synthesis result. The composite image generated by the image synthesizer 300 may have a higher resolution than the plurality of image frames output from the image sensor 200.

The plurality of image frames may include image frames generated along respectively different optical paths changed by the variable filter unit 110. The image synthesizer 300 may be referred to as a postprocessor. The plurality of image frames may include a first image frame and a second image frame, and the second image frame may be an image frame shifted by a first interval (e.g. a subpixel interval) on the basis of the first image frame.

The controller 400 may control the variable filter unit 110 and the image sensor 200 such that the image sensor 200 generates an image signal in synchronization with the control state of the variable filter unit 110. To this end, the controller 400 may transmit and receive a first signal to and from the variable filter unit 110, and may transmit and receive a second signal to and from the image sensor 200. Here, the first and second signals correspond to the aforementioned control signal.

The first signal may be generated by the controller 400, and may include a tilting control signal for controlling the optical path of the variable filter unit 110 or may include a tilting control signal for controlling the FOV angle of the variable filter unit 110. In particular, the tilting control signal may determine the optical path of light passing through the variable filter unit 110. In addition, the tilting control signal may determine the direction and angle to which the FOV angle of the variable filter unit 110 is changed. In some embodiments, the first signal may be generated by the variable filter unit 110, and may include a response signal indicating that the variable filter unit 110 has been completely controlled according to the tilting control signal. The controller 400 may be referred to as a variable filter driver.

The second signal may be generated by the image sensor 200, and may include a synchronization signal instructing transmission of the tilting control signal to the variable filter unit 110. In some embodiments, the second signal may be generated by the image sensor 200, and may include control information, based on which a control signal for controlling the optical path of the variable filter unit 110 is generated. In some embodiments, the second signal may be generated by the controller 400, and may include a feedback signal indicating reception of a response signal indicating that the variable filter unit 110 has been completely controlled according to the tilting control signal.

In addition, the second signal may include a driving signal for driving the image sensor 200.

Here, the signals included in the first signal and the second signal are merely exemplary, and, as needed, may be omitted, or other signals may be added thereto.

Hereinafter, various embodiments of the camera module 10 shown in FIG. 1 will be described with reference to the accompanying drawings.

FIGS. 2A to 2D are views illustrating the cross-sections of embodiments 10A, 10B, 10C and 10D of the camera module 10 shown in FIG. 1.

Referring to FIGS. 2A to 2D, the camera module 10A, 10B, 10C or 10D may include a lens assembly, an image sensor 200, and a main board 250. Here, the lens assembly may include a variable filter unit 110A, 110B, 110C or 110D, a holder 130, a lens barrel 140, a first lens unit 150, and a second lens unit 160. At least one of these components may be omitted, or the vertical arrangement of these components may be changed.

The variable filter units 110A, 110B, 110C and 110D shown in FIGS. 2A to 2D correspond to the embodiment of the variable filter unit 110 shown in FIG. 1. That is, the variable filter units 110A, 110B, 110C and 110D may change the optical path under the control of the controller 400.

The holder 130 serves to accommodate at least one lens and support the same. The holder 130 may be coupled to the lens barrel 140 to support the lens barrel 140, and may be coupled to the main board 250 to which the image sensor 200 is attached.

The holder 130 may have a spiral structure, and may be rotatably engaged with the lens barrel 140 having a spiral structure as well. However, this is merely exemplary, and the holder 130 and the lens barrel 140 may be coupled to each other using an adhesive (e.g. an adhesive resin such as epoxy), or the holder 130 and the lens barrel 140 may be integrally formed with each other.

The lens barrel 140 may be coupled to the holder 130, and may include a space formed therein to accommodate the first lens unit 150 and the second lens unit 160. The lens barrel 140 may be rotatably engaged with the first lens unit 150 and the second lens unit 160, but this is merely exemplary. These components may be engaged in any of other manners, for example, using an adhesive.

The first lens unit 150 may be disposed in front of the second lens unit 160. The first lens unit 150 may be composed of at least one lens, or two or more lenses may be aligned along the central axis of the first lens unit 150 to form an optical system. Here, the central axis may be the same as the optical axis of the optical system of the camera module 10 (10A to 10D). The first lens unit 150 may be composed of one lens, as shown in FIGS. 2A to 2D, but the disclosure is not necessarily limited thereto.

The second lens unit 160 may be disposed behind the first lens unit 150. Light incident on the first lens unit 150 from the outside of the camera module 10 (10A to 10D) may pass through the first lens unit 150 and may be incident on the second lens unit 160. The second lens unit 160 may be composed of at least one lens, or two or more lenses may be aligned along the central axis of the second lens unit 160 to form an optical system. Here, the central axis may be the same as the optical axis of the optical system of the camera module 10 (10A to 10D). The second lens unit 160 may be composed of one lens, as shown in FIGS. 2A to 2D, but the disclosure is not necessarily limited thereto.

The first lens unit 150 and the second lens unit 160 may be referred to as a 'first solid lens unit' and a 'second solid lens unit', respectively, in order to be distinguished from a liquid lens.

In each of FIGS. 2A to 2D, the lens assembly is illustrated as including two lens units 150 and 160, but the embodiment is not limited thereto. In another embodiment, the lens assembly may include only one lens unit, or may include three or more lens units.

Figure 2A:
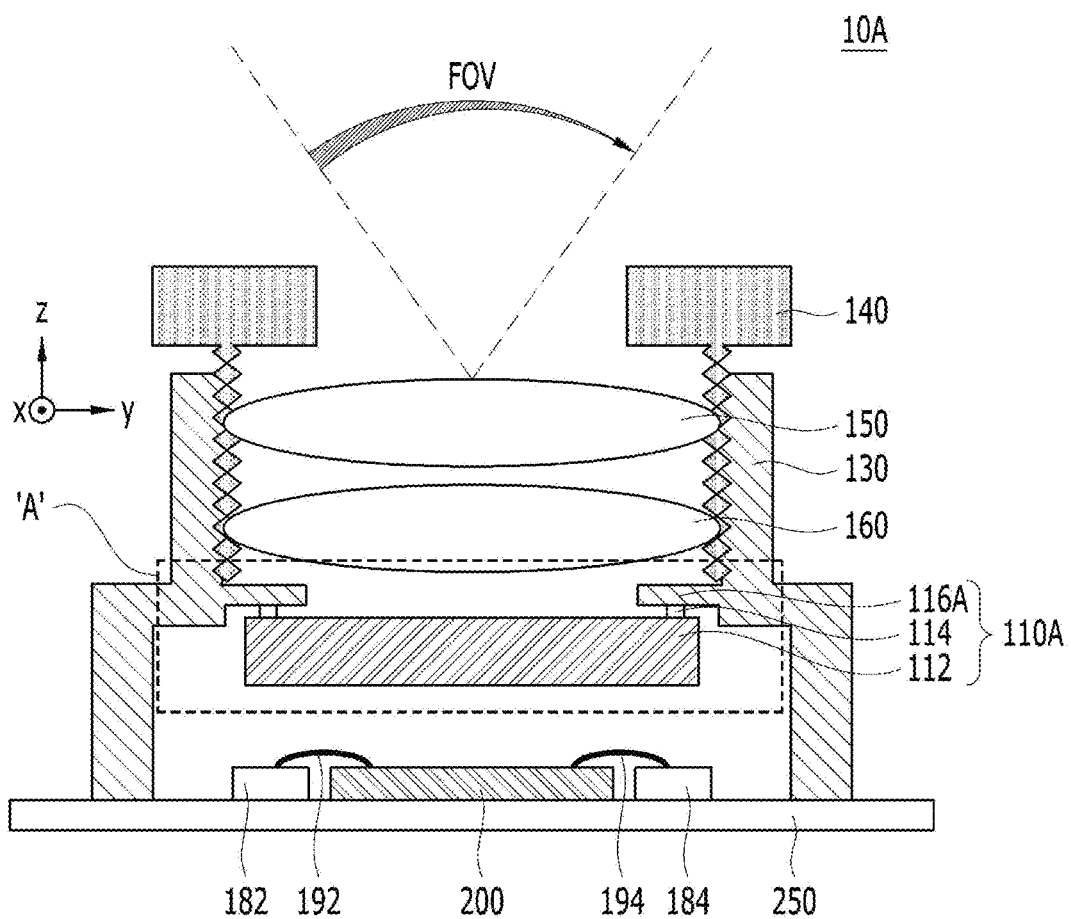
FIGS. 2A to 2D are views illustrating the cross-sections of embodiments of the camera module shown in FIG. 1.
Figure 2B:
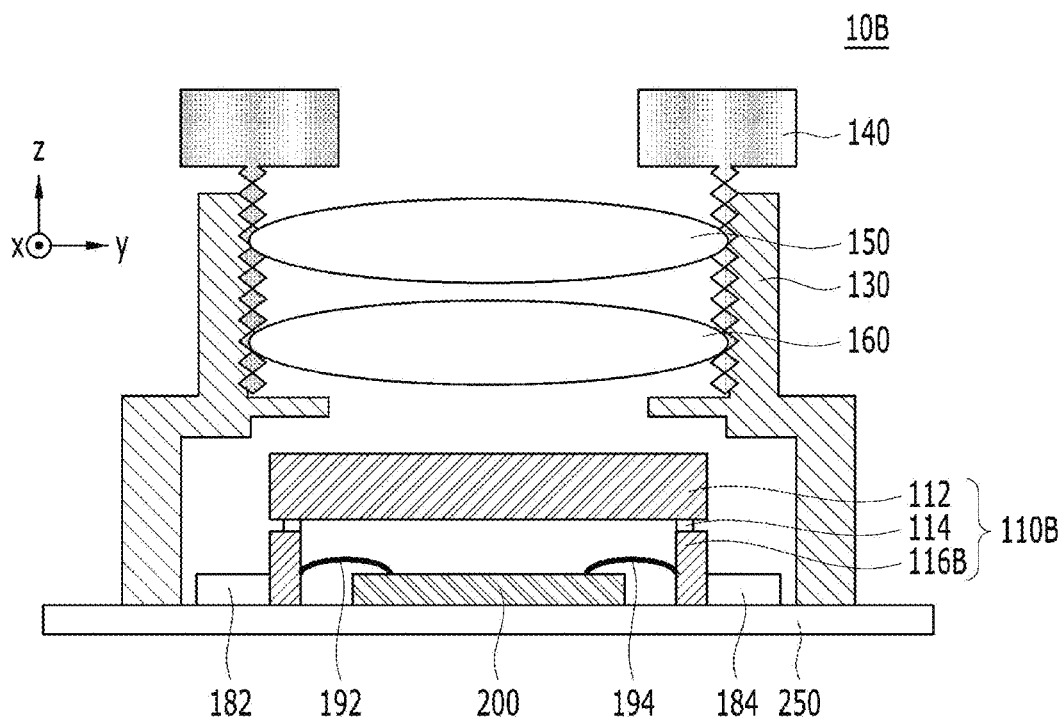

The variable filter unit 110 (110A to 110D) may be disposed at various positions in the lens assembly. FIGS. 2A and 2B illustrate exemplary positions at which the variable filter unit 110 is disposed, and the variable filter unit 110 may be located elsewhere depending on the presence or absence of the first lens unit 150 and the second lens unit 160 or depending on the relative positions thereof. However, the variable filter unit 110 (110A to 110D) may be located on the optical path, which is a region through which light incident on the lens assembly passes, and may change the optical path.

As shown in FIG. 2A or 2B, the variable filter unit 110A or 110B may be disposed in an empty space under the lens barrel 140 in the holder 130. In this case, the filter 112 of the variable filter unit 110A or 110B may filter light within a specific wavelength range among light beams that have passed through the second lens unit 160.

According to an embodiment, as shown in FIG. 2A, the variable filter unit 110A may further include a first support member 116A, in addition to the filter 112 and the actuator 114. The first support member 116A may have a cross-sectional shape that protrudes from the inner surface of the holder 130 under the lens units 150 and 160 disposed in the holder 130. The filter 112 and the actuator 114 may be supported by the first support member 116A.

According to another embodiment, as shown in FIG. 2B, the variable filter unit 110B may further include a second support member 116B, in addition to the filter 112 and the actuator 114. The second support member 116B may have a cross-sectional shape that protrudes upwards around the image sensor 200 on the main board 250 toward the lens barrel 140. In this case, the filter 112 and the actuator 114 may be supported by the second support member 116B.

Figure 2C:
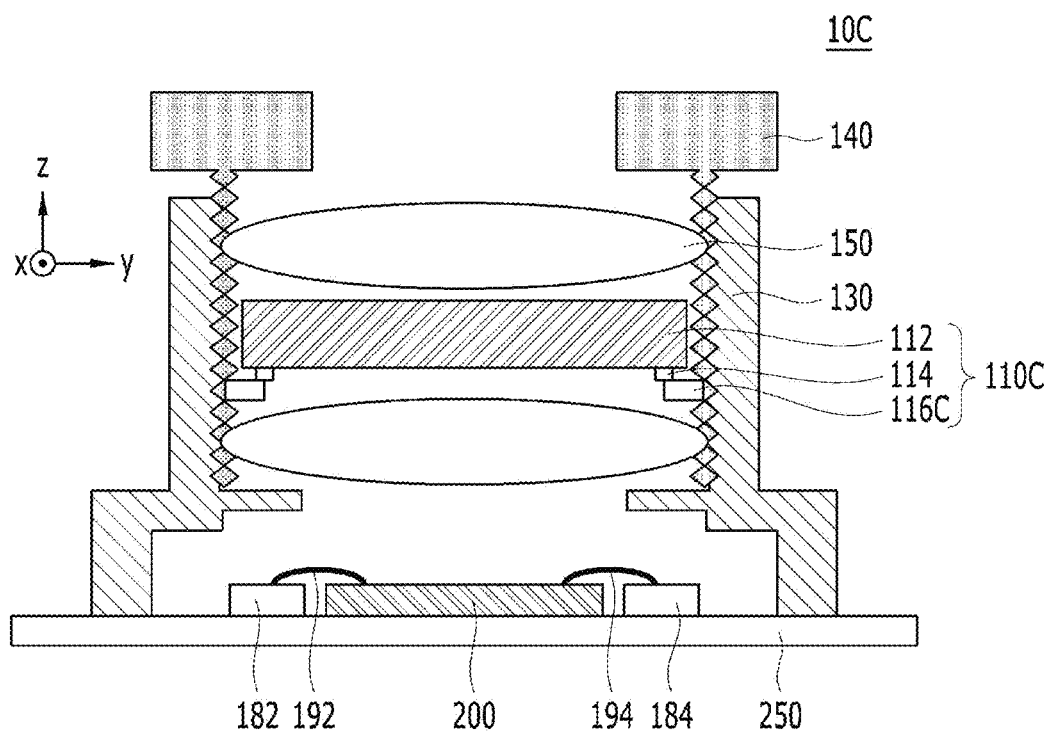

According to still another embodiment, as shown in FIG. 2C, in the case in which the lens assembly includes a plurality of lens units 150 and 160, the variable filter unit 110C may be disposed between the first lens unit 150 and the second lens unit 160. In this case, the variable filter unit 110C may further include a third support member 116C, in addition to the filter 112 and the actuator 114. The third support member 116C may have a cross-sectional shape that protrudes from the inner surface of the lens barrel 140 between the first lens unit 150 and the second lens unit 160. The filter 112 and the actuator 114 may be supported by the third support member 116C.

Figure 2D:
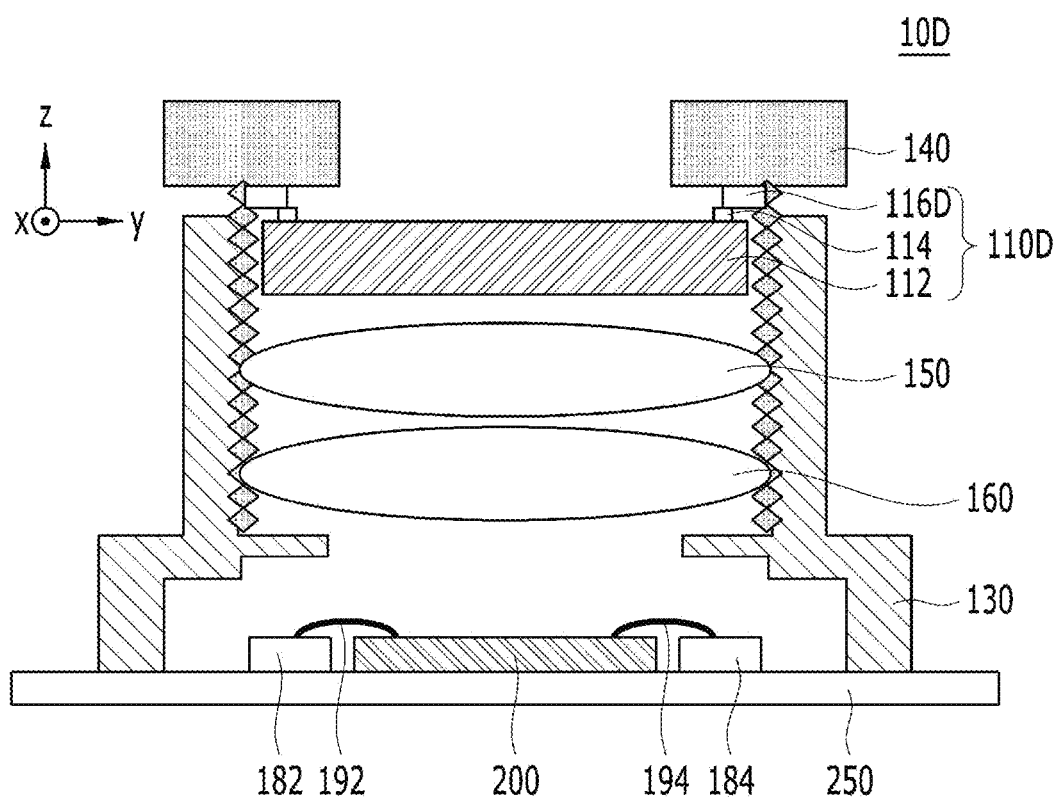

According to still another embodiment, as shown in FIG. 2D, the variable filter unit 110D may be disposed on the first lens unit 150. In this case, the variable filter unit 110D may further include a fourth support member 116D, in addition to the filter 112 and the actuator 114. The fourth support member 116D may have a cross-sectional shape that protrudes from the inner surface of the lens barrel 140 above the lens unit 150 located at the uppermost position among the lens units included in the lens assembly. The filter 112 and the actuator 114 may be supported by the fourth support member 116D.

The image sensor 200 may be mounted on the main board 250, and may perform a function of converting light having passed through the lens assembly into an image signal.

The main board 250 may be disposed under the holder 130 and may include wires for transmitting an electrical signal between the respective components together with the image synthesizer 300 and the controller 400. In addition, a connector (not shown) for realizing electrical connection with a power source or other devices (e.g. an application processor) present outside the camera module 10A to 10D may be connected to the main board 250.

In addition, a plurality of passive elements 182 and 184 may be disposed on the main board 250, and these passive elements 182 and 184 may be connected to the main board 250 through wires 192 and 194.

The main board 250 may be configured as a rigid flexible printed circuit board (RFPCB) and may be bent depending on the requirements of the space in which the camera module 10A to 10D is mounted, but the embodiment is not limited thereto.

The camera modules 10A to 10D shown in FIGS. 2A to 2D have the same configuration as each other except that the positions at which the variable filter units 110A to 110D are disposed are different.

In addition, although not shown, the camera modules 10A to 10D shown in FIGS. 2A to 2D may further include a cover. The cover may be disposed so as to surround the components of the camera modules 10A to 10D while exposing an upper opening in the lens assembly, thereby protecting the components of the camera modules 10A to 10D.

The actuator 114 shown in FIGS. 2A to 2D may tilt the filter 112 in response to a control signal output from the controller 400, i.e. a first signal. To this end, the actuator 114 may be disposed between the first, second, third or fourth support member 116A, 116B, 116C or 116D and the filter 112.

The actuator 114 may control the tilting angle of the filter 112, that is, the physical displacement thereof, under the control of the controller 400, thereby changing the path of light incident on the pixel array of the image sensor 200 from the outside. That is, when the filter 112 is tilted, the optical path may be changed.

The actuator 114 may precisely tilt the filter 112 and may be driven in response to a driving signal (or operating voltage) output from the controller 400 in the form of voltage or current. Here, the driving signal may be included in the first signal.

For example, the filter 112 may be tilted with respect to the horizontal plane, perpendicular to the optical axis, by the actuator 114. For example, the tilting angle of the filter 112 may be 1° or less, but the embodiment is not limited thereto.

Hereinafter, the operation of changing the FOV angle of the variable filter unit 110A will be described with reference to FIG. 2A. The following description is also applicable to the variable filter units 110B to 110D shown in FIGS. 2B to 2D.

Referring to FIG. 2A, the lens assembly may have a specific field of view (FOV). The FOV may refer to a range of incident light within which the image sensor 200 is capable of performing a capture operation through the lens assembly, and may be defined as an FOV angle. The FOV angle of a typical lens assembly may range from 60° to 140°. On the basis of the x-axis and the y-axis defined when the lens assembly is viewed from above (i.e. from the optical axis), the FOV angle may include a first FOV angle Fx and a second FOV angle Fy. The first FOV angle Fx refers to the angle of the FOV that is determined along the x-axis, and the second FOV angle Fy refers to the angle of the FOV that is determined along the y-axis.

A plurality of pixels included in the pixel array of the image sensor 200 may be arranged in the form of an N×M matrix (where each of N and M is an integer of 1 or more). That is, N pixels may be disposed along the x-axis, and M pixels may be disposed along the y-axis. An optical signal incident through the FOV corresponding to the first FOV angle Fx and the second FOV angle Fy is incident on the N×M pixel array.

The optical path of light passing through the lens assembly or the FOV of the lens assembly may be changed by a tilting control signal included in the first signal. The tilting control signal may individually change the first FOV angle Fx and the second FOV angle Fy. The changes in the first FOV angle Fx and the second FOV angle Fy according to the tilting control signal are determined by a first angle variation θI_x and a second angle variation θI_y.

The first angle variation θI_x and the second angle variation θI_y may be defined by the following Equation 1 and Equation 2, respectively.

$$\frac{Fx}{N} \times a < \theta I\_x < \frac{Fx}{N} \times b \quad \text{[Equation 1]}$$

$$\frac{Fy}{M} \times a < \theta I\_y < \frac{Fy}{M} \times b \quad \text{[Equation 2]}$$

Here, a may have a value greater than 0.1 and less than 0.5, and b may have a value greater than 1 and less than 2. However, the scope of the embodiment is not limited thereto.

In this case, θI_x and θI_y are angle variations with respect to an image generated by the image sensor 200, which are caused by tilting of the filter 112. The actual tilting angle of the filter 112 may be greater or less than the above angle variations.

Figure 3:
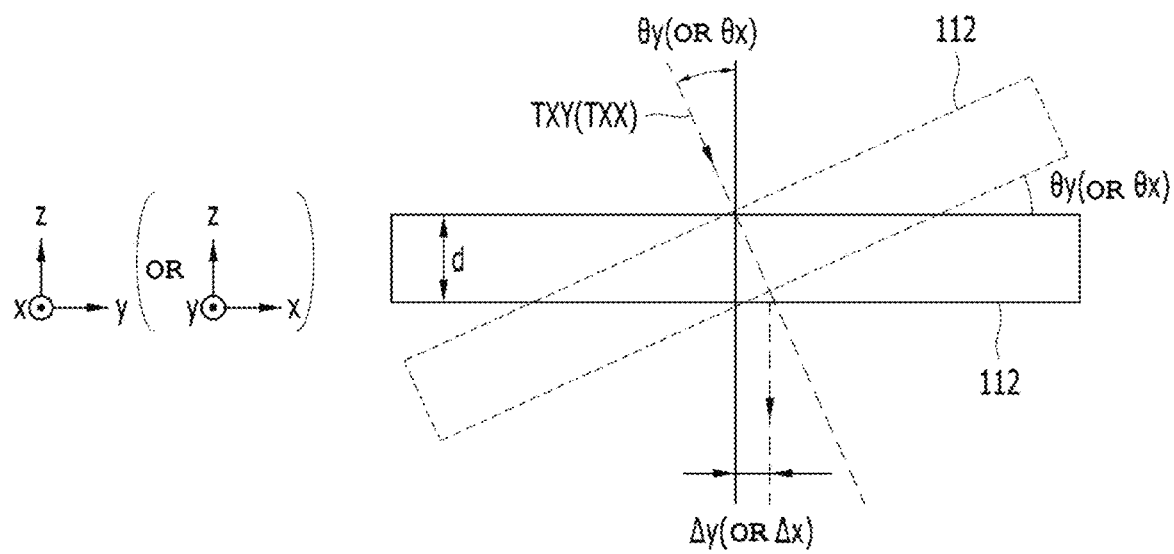
FIG. 3 is a view for explaining the movement of an image generated by an image sensor according to tilting of a filter in a variable filter unit according to the above embodiments.

FIG. 3 is a view for explaining the movement of an image generated by the image sensor 200 according to tilting of the filter 112 in the variable filter units 110A to 110D according to the above-described embodiments.

Referring to FIG. 3, when the filter 112 is not tilted, the filter 112 is positioned on a horizontal plane, perpendicular to the optical axis, on the basis of the tilting axes TXX and TXY. However, when the filter 112 is tilted by the actuator 114 and the tilting angle is defined as θx or θy depending on the direction, the difference in the distance by which the optical path is changed and shifted by tilting of the filter 112 is expressed using the following Equations 3 and 4.

$$\Delta x = d \times \tan\left\{\sin^{-1}\left(\frac{n_o}{n_g}\sin\theta_x\right)\right\} \quad \text{[Equation 3]}$$

$$\Delta y = d \times \tan\left\{\sin^{-1}\left(\frac{n_o}{n_g}\sin\theta_y\right)\right\} \quad \text{[Equation 4]}$$

Here, Δx represents the difference in shifting distance on the x-axis, Δy represents the difference in shifting distance on the y-axis, $n_o$ represents the refractive index of air, d represents the thickness of the filter 112, and $n_g$ represents the refractive index of the filter 112.

In addition, in order to implement the above-described operation, the actuator 114 may be a voice coil motor (VCM), a piezoelectric element, a shape memory alloy (SMA) (or a muscle wire), microelectromechanical systems (MEMS), or a liquid lens, but the embodiment is not limited to any specific shape of the actuator 114.

Here, 0.1 mm≤d≤1 mm, and 0.1 μm≤Δx, Δy≤25 μm. For example, the difference in distance Δy that the pixel is shifted along the x-axis in the image sensor 200 may be 7 μm when the tilting angle θy is 1.5°, the actuator 114 is implemented as a piezoelectric element, the distance that the piezoelectric element moves is 65.6 μm, the thickness d of the filter 112 is 0.4 mm, the refractive index $n_g$ of the filter 112 is 1.5, and the size of each pixel included in the image sensor 200 is 14 μm.

In the case in which the actuator 114 is implemented in the form of a voice coil motor (VCM), a coil is disposed around the holder 130 or the lens barrel 140, and a magnet is disposed at a position spaced apart from the coil, with the result that the filter 112 is tilted by the electromagnetic force that is generated by the interaction between the magnet and the coil.

Hereinafter, embodiments of the variable filter units 110A to 110D will be described with reference to the accompanying drawings. Although the actuator 114 will be described as being a piezoelectric element, the following description may also be applied to the case in which the actuator 114 is implemented as any type other than the piezoelectric element.

Figure 4A:
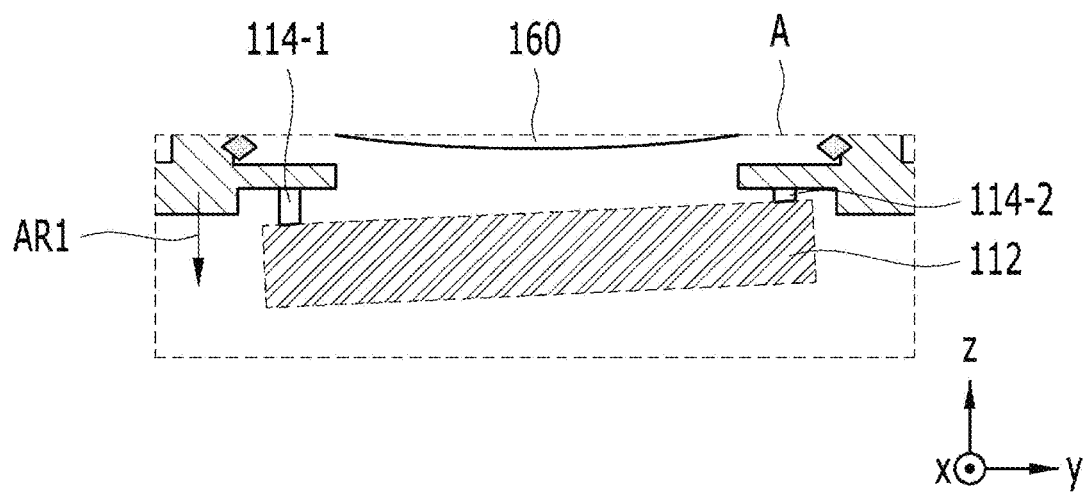
FIGS. 4A and 4B are enlarged cross-sectional views of portion 'A' shown in FIG. 2A.
Figure 4B:
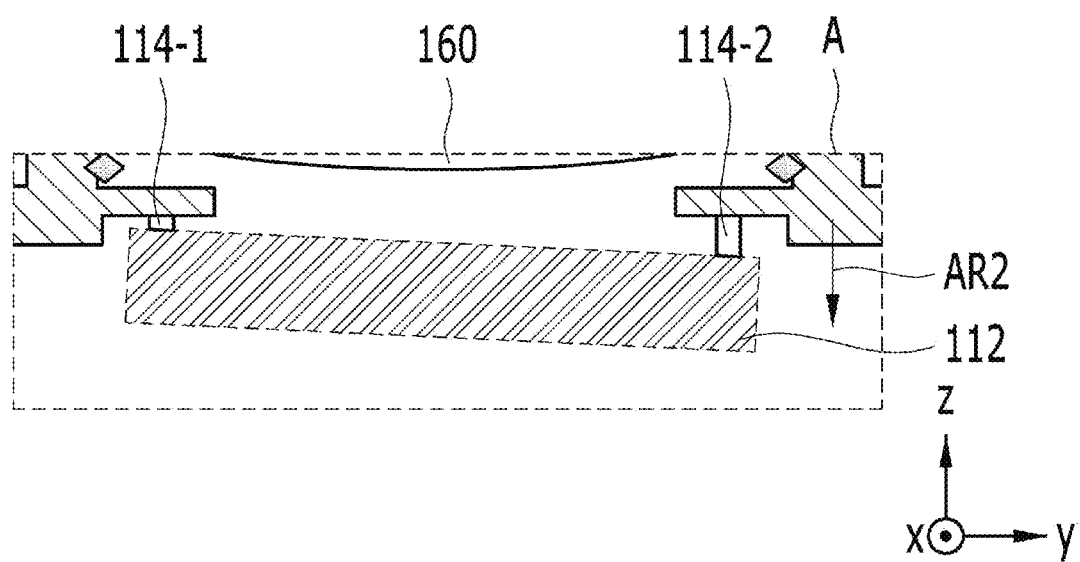

FIGS. 4A and 4B are enlarged cross-sectional views of portion 'A' shown in FIG. 2A.

The actuator 114 for tilting the filter 112 may include a plurality of piezoelectric elements, which operate independently of each other. The piezoelectric elements may operate in response to a driving signal (or driving voltage or operating voltage), and may change in length in a specific direction according to the level of the driving voltage.

Referring to FIGS. 4A and 4B, the actuator 114 may include a plurality of piezoelectric elements 114-1 and 114-2, which are disposed so as to be spaced apart from each other and operate independently of each other.

When, among the plurality of piezoelectric elements 114-1 and 114-2, driving voltage is applied to the piezoelectric element 114-1 located on the left side but is not applied to the piezoelectric element 114-2 located on the right side, as shown in FIG. 4A, the length of the piezoelectric element 114-1 receiving the driving voltage may increase, with the result that the filter 112 may be tilted to the left, as indicated by the arrow AR1.

Alternatively, when, among the plurality of piezoelectric elements 114-1 and 114-2, driving voltage is applied to the piezoelectric element 114-2 located on the right side but is not applied to the piezoelectric element 114-1 located on the left side, as shown in FIG. 4B, the length of the piezoelectric element 114-2 receiving the driving voltage may increase, with the result that the filter 112 may be tilted to the right, as indicated by the arrow AR2.

As shown in FIGS. 4A and 4B, it can be seen that it is possible to tilt the filter 112 using the characteristics of a piezoelectric element that changes in length. Piezoelectric elements having such characteristics may be disposed on the filter 112 in various forms, which will be described below.

FIGS. 5A to 5D illustrate plan views of the variable filter unit 110 according to an embodiment. In each drawing, '0' denotes the state in which operating voltage is not applied to the piezoelectric element, and '+1' denotes the state in which operating voltage is applied to the piezoelectric element.

Referring to FIGS. 5A to 5D, the actuator 114 may include a plurality of first piezoelectric elements PE1 to PE4, which are disposed on the respective corners of the filter 112 and operate independently of each other.

Figure 5A:
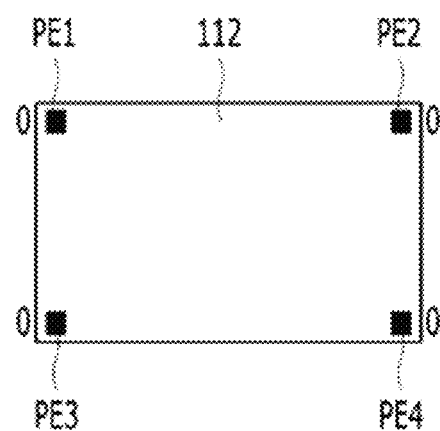
FIGS. 5A to 5D illustrate plan views of a variable filter unit according to an embodiment.

In the case of FIG. 5A, since operating voltage is applied to none of the first piezoelectric elements PE1 to PE4, the filter 112 is positioned on the horizontal plane, perpendicular to the optical axis, and is not tilted.

Figure 5B:
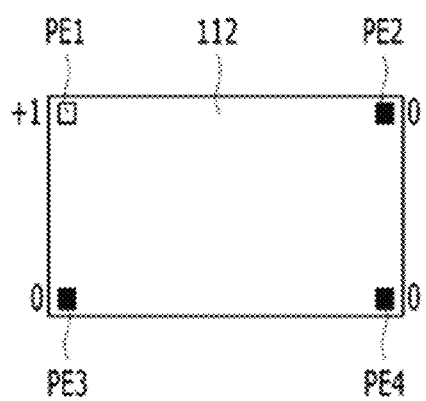

In the case of FIG. 5B, operating voltage is applied only to one PE1 of the first piezoelectric elements PE1 to PE4 but is not applied to the remainder PE2 to PE4 thereof. Accordingly, the filter 112 may be tilted toward the position at which the piezoelectric element PE1 to which the operating voltage is applied is located.

Figure 5C:
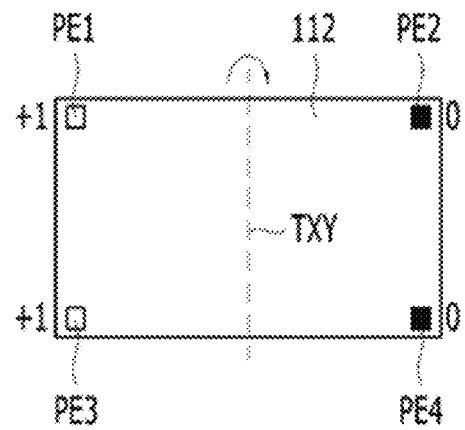

In the case of FIG. 5C, operating voltage is applied only to some PE1 and PE3 of the first piezoelectric elements PE1 to PE4 but is not applied to the remainder PE2 and PE4 thereof. Accordingly, the filter 112 may be tilted toward the positions at which the piezoelectric elements PE1 and PE3 to which the operating voltage is applied are located. In this case, as shown in FIG. 3, the filter 112 may be tilted to the left on the basis of the tilting axis TXY.

Figure 5D:
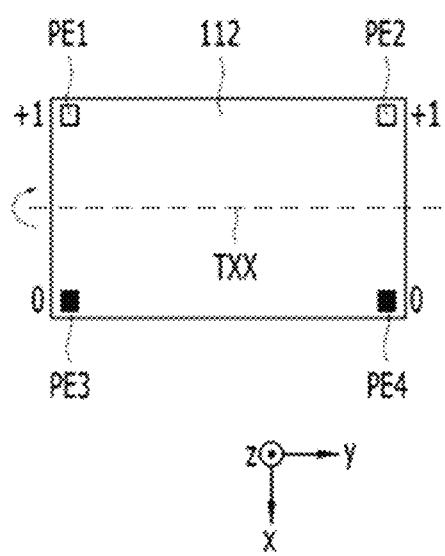
Figure 5D:
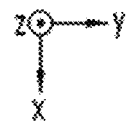

In the case of FIG. 5D, operating voltage is applied only to some PE1 and PE2 of the first piezoelectric elements PE1 to PE4 but is not applied to the remainder PE3 and PE4 thereof. Accordingly, the filter 112 may be tilted toward the positions at which the piezoelectric elements PE1 and PE2 to which the operating voltage is applied are located. In this case, the filter 112 may be tilted on the basis of the tilting axis TXX.

FIGS. 6A to 6D illustrate plan views of the variable filter unit 110 according to another embodiment. In each drawing, '0' denotes the state in which operating voltage is not applied to the piezoelectric element, and '+1' denotes the state in which operating voltage is applied to the piezoelectric element.

Referring to FIGS. 6A to 6D, the actuator 114 may include a plurality of second piezoelectric elements PE5 to PE12, which are disposed closer to the tilting axes TXX and TXY of the filter 112 than to the corners of the filter 112 while being spaced apart from each other and operate independently of each other.

Figure 6A:
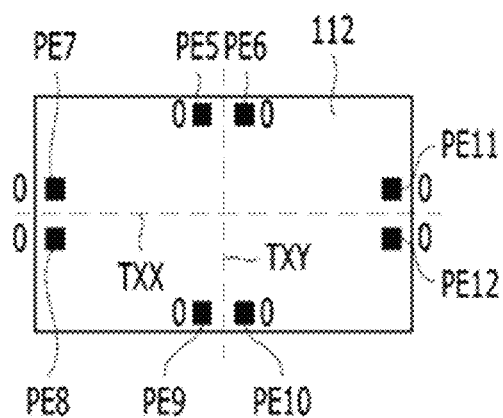
FIGS. 6A to 6D illustrate plan views of a variable filter unit according to another embodiment.

In the case of FIG. 6A, since operating voltage is applied to none of the second piezoelectric elements PE5 to PE12, the filter 112 is positioned on the horizontal plane, perpendicular to the optical axis, and is not tilted.

Figure 6B:
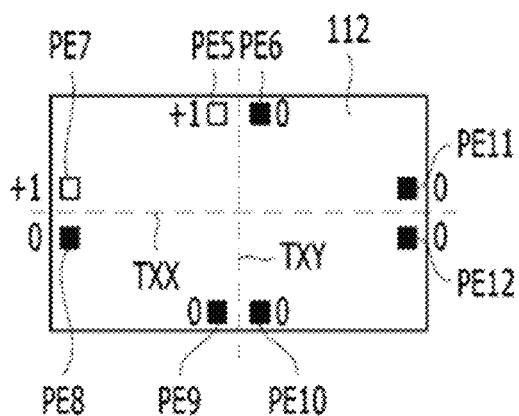

In the case of FIG. 6B, operating voltage is applied only to some PE5 and PE7 of the second piezoelectric elements PE5 to PE12 but is not applied to the remainder PE6 and PE8 to PE12 thereof. Accordingly, the filter 112 may be tilted toward the position at which the piezoelectric elements PE5 and PE7 to which the operating voltage is applied are located.

Figure 6C:
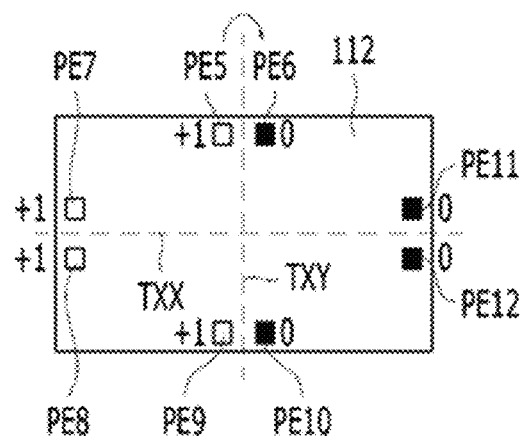

In the case of FIG. 6C, operating voltage is applied only to some PE5, PE7, PE8 and PE9 of the second piezoelectric elements PE5 to PE12 but is not applied to the remainder PE6, PE10, PE11 and PE12 thereof. Accordingly, the filter 112 may be tilted toward the positions at which the piezoelectric elements PE5, PE7, PE8 and PE9 to which the operating voltage is applied are located. In this case, as shown in FIG. 3, the filter 112 may be tilted to the left on the basis of the tilting axis TXY.

Figure 6D:
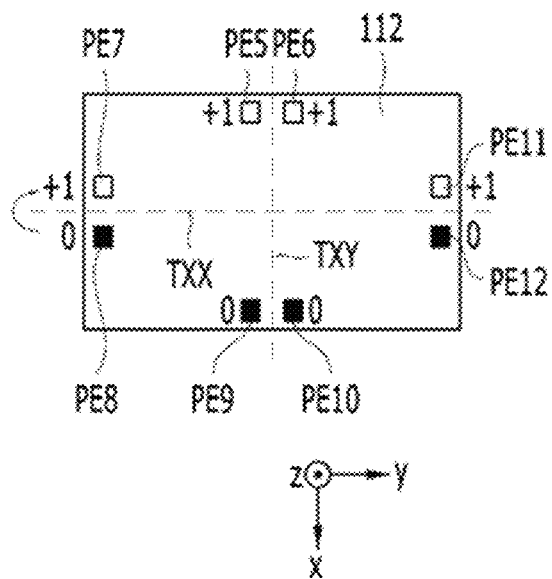

In the case of FIG. 6D, operating voltage is applied only to some PE5, PE6, PE7 and PE11 of the second piezoelectric elements PE5 to PE12 but is not applied to the remainder PE8, PE9, PE10 and PE12 thereof. Accordingly, the filter 112 may be tilted toward the positions at which the piezoelectric elements PE5, PE6, PE7 and PE11 to which the operating voltage is applied are located. In this case, the filter 112 may be tilted on the basis of the tilting axis TXX.

FIGS. 7A to 7D illustrate plan views of the variable filter unit 110 according to still another embodiment. In each drawing, '0' denotes the state in which operating voltage is not applied to the piezoelectric element, and '+1' denotes the state in which operating voltage is applied to the piezoelectric element.

Referring to FIGS. 7A to 7D, the actuator 114 may include a third piezoelectric element PE13, which is disposed on a first edge of the filter 112, and a fourth piezoelectric element PE14, which is disposed on a second edge of the filter 112, which is opposite the first edge in the x-axis direction. The third and fourth piezoelectric elements PE13 and PE14 may operate independently of each other.

Figure 7A:
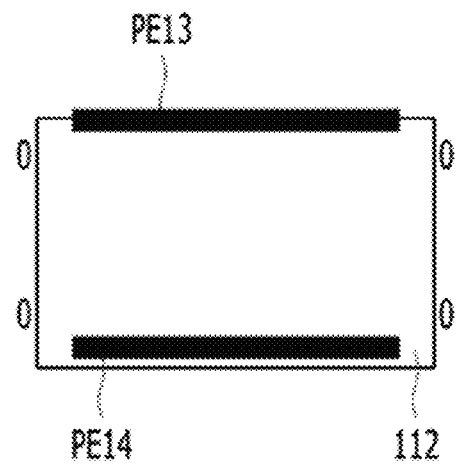
FIGS. 7A to 7D illustrate plan views of a variable filter unit according to still another embodiment.

In the case of FIG. 7A, since operating voltage is applied to none of the third and fourth piezoelectric elements PE13 and PE14, the filter 112 is positioned on the horizontal plane, perpendicular to the optical axis, and is not tilted.

Figure 7B:
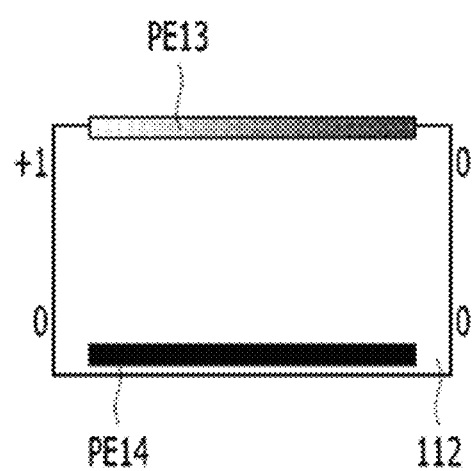

In the case of FIG. 7B, operating voltage is applied to the left portion of the third piezoelectric element PE13 but is not applied to the right portion thereof, and operating voltage is not applied to the fourth piezoelectric element PE14. Accordingly, the filter 112 may be tilted toward the left portion of the third piezoelectric element PE13 to which the operating voltage is applied.

Figure 7C:
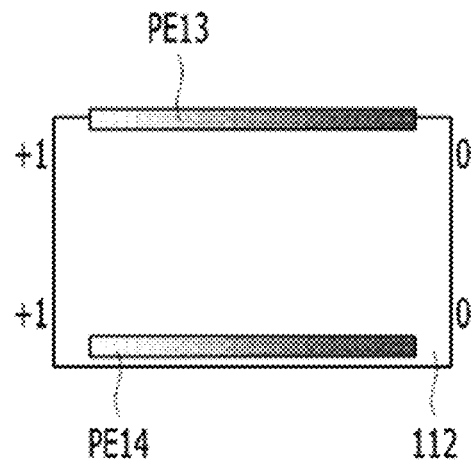

In the case of FIG. 7C, operating voltage is applied to the left portion of each of the third and fourth piezoelectric elements PE13 and PE14 but is not applied to the right portion thereof. Accordingly, the filter 112 may be tilted toward the portions to which the operating voltage is applied.

Figure 7D:
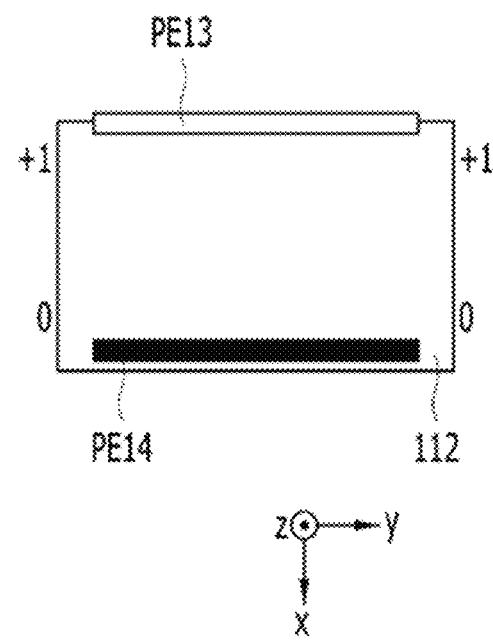

In the case of FIG. 7D, operating voltage is applied to both side portions of the third piezoelectric element PE13 but is not applied to the fourth piezoelectric element PE14. Accordingly, the filter 112 may be tilted toward the position at which the third piezoelectric element PE13 to which the operating voltage is applied is located.

FIGS. 8A to 8D illustrate plan views of the variable filter unit 110 according to still another embodiment. In each drawing, '0' denotes the state in which operating voltage is not applied to the piezoelectric element, and '+1' denotes the state in which operating voltage is applied to the piezoelectric element.

Referring to FIGS. 8A to 8D, the actuator 114 may include a fifth piezoelectric element PE15, which is disposed on a third edge of the filter 112, and a sixth piezoelectric element PE16, which is disposed on a fourth edge of the filter 112, which is opposite the third edge in the y-axis direction. The fifth and sixth piezoelectric elements PE15 and PE16 may operate independently of each other.

Figure 8A:
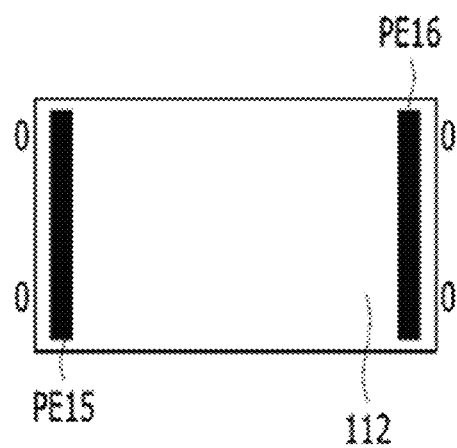
FIGS. 8A to 8D illustrate plan views of a variable filter unit according to still another embodiment.

In the case of FIG. 8A, since operating voltage is applied to none of the fifth and sixth piezoelectric elements PE15 and PE16, the filter 112 is positioned on the horizontal plane, perpendicular to the optical axis, and is not tilted.

Figure 8B:
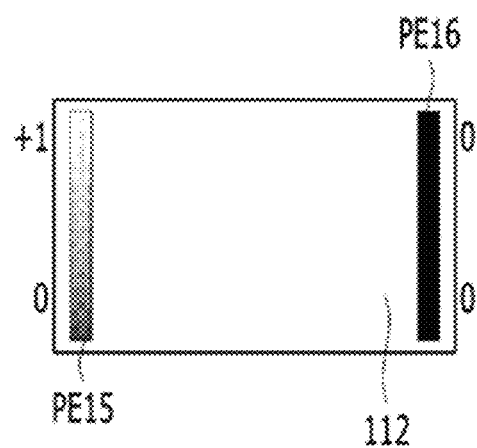

In the case of FIG. 8B, operating voltage is applied to the upper portion of the fifth piezoelectric element PE15 but is not applied to the lower portion thereof, and operating voltage is not applied to the sixth piezoelectric element PE16. Accordingly, the filter 112 may be tilted toward the upper portion of the fifth piezoelectric element PE15 to which the operating voltage is applied.

Figure 8C:
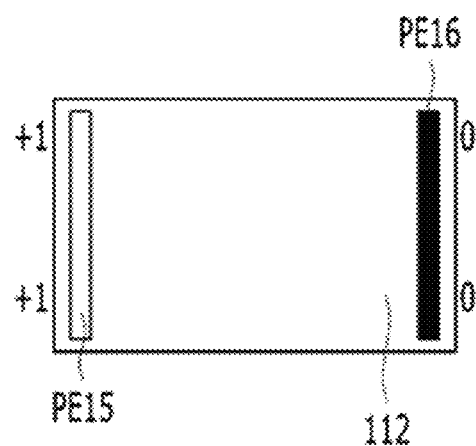

In the case of FIG. 8C, operating voltage is applied to the upper and lower portions of the fifth piezoelectric element PE15 but is not applied to the sixth piezoelectric element PE16. Accordingly, the filter 112 may be tilted toward the position at which the fifth piezoelectric element PE15 to which the operating voltage is applied is located.

Figure 8D:
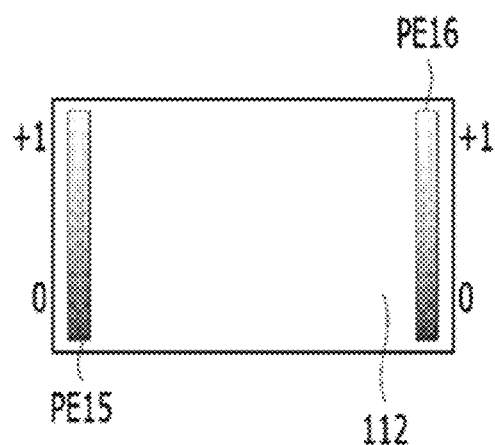
Figure 8D:
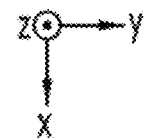

In the case of FIG. 8D, operating voltage is applied to the upper portion of each of the fifth and sixth piezoelectric elements PE15 and PE16 but is not applied to the lower portion thereof. Accordingly, the filter 112 may be tilted toward the portions to which the operating voltage is applied.

Figure 9:
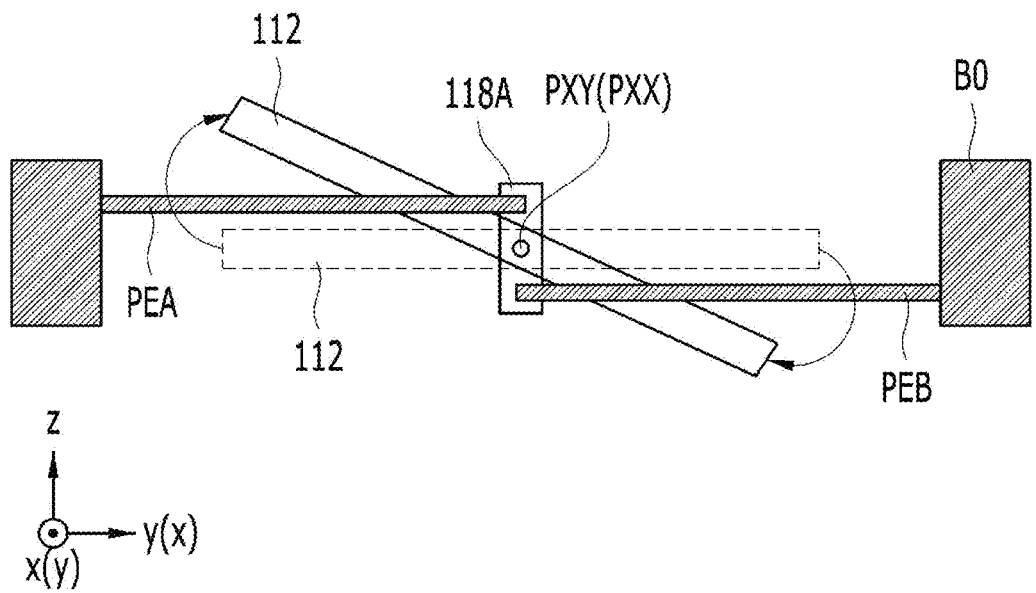
FIG. 9 illustrates a cross-sectional view of a variable filter unit according to still another embodiment.

FIG. 9 illustrates a cross-sectional view of the variable filter unit 110 according to still another embodiment.

The variable filter unit 110 shown in FIG. 9 may include a filter 112, piezoelectric elements PEA and PEB, and a central shaft part 118A. The piezoelectric elements PEA and PEB are connected to respective end portions of the central shaft part 118A, which is disposed on a tilting shaft PX (e.g. PXX or PXY) of the filter 112. In the case in which operating voltage is applied to one piezoelectric element PEA but is not applied to the other piezoelectric element PEB, the length of the piezoelectric element PEA to which the operating voltage is applied may increase, with the result that the filter 112 may be tilted in the direction indicated by the arrow. Alternatively, in the case in which operating voltage is applied to one piezoelectric element PEB but is not applied to the other piezoelectric element PEA, the length of the piezoelectric element PEB to which the operating voltage is applied may increase, with the result that the filter 112 may be tilted in a direction opposite the direction indicated by the arrow.

Figure 10:
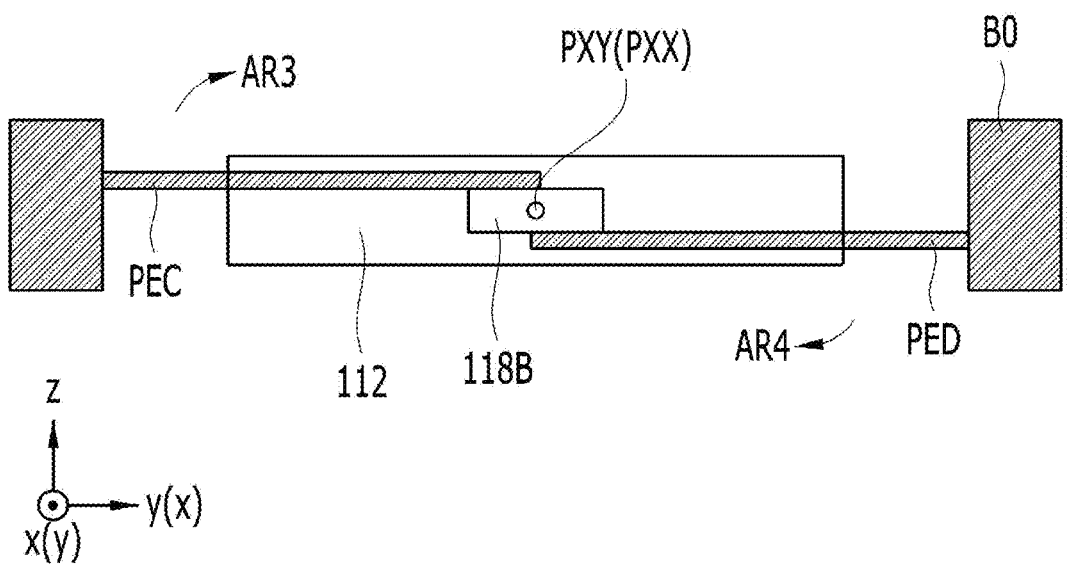
FIG. 10 illustrates a cross-sectional view of a variable filter unit according to still another embodiment.

FIG. 10 illustrates a cross-sectional view of the variable filter unit 110 according to still another embodiment. Here, the piezoelectric element may decrease in length when receiving operating voltage.

The variable filter unit 110 shown in FIG. 10 may include a filter 112, piezoelectric elements PEC and PED, and a central shaft part 118B. The piezoelectric elements PEC and PED are respectively connected to opposite edges of the upper portion of the central shaft part 118B, which is disposed on a tilting shaft PX (e.g. PXX or PXY) of the filter 112. In the case in which operating voltage is applied to one piezoelectric element PEC but is not applied to the other piezoelectric element PED, the length of the piezoelectric element PEC to which the operating voltage is applied may decrease, with the result that the filter 112 may be tilted in the direction indicated by the arrow AR4. Alternatively, in the case in which operating voltage is applied to one piezoelectric element PED but is not applied to the other piezoelectric element PEC, the length of the piezoelectric element PED to which the operating voltage is applied may decrease, with the result that the filter 112 may be tilted in the direction indicated by the arrow AR3.

Figure 11:
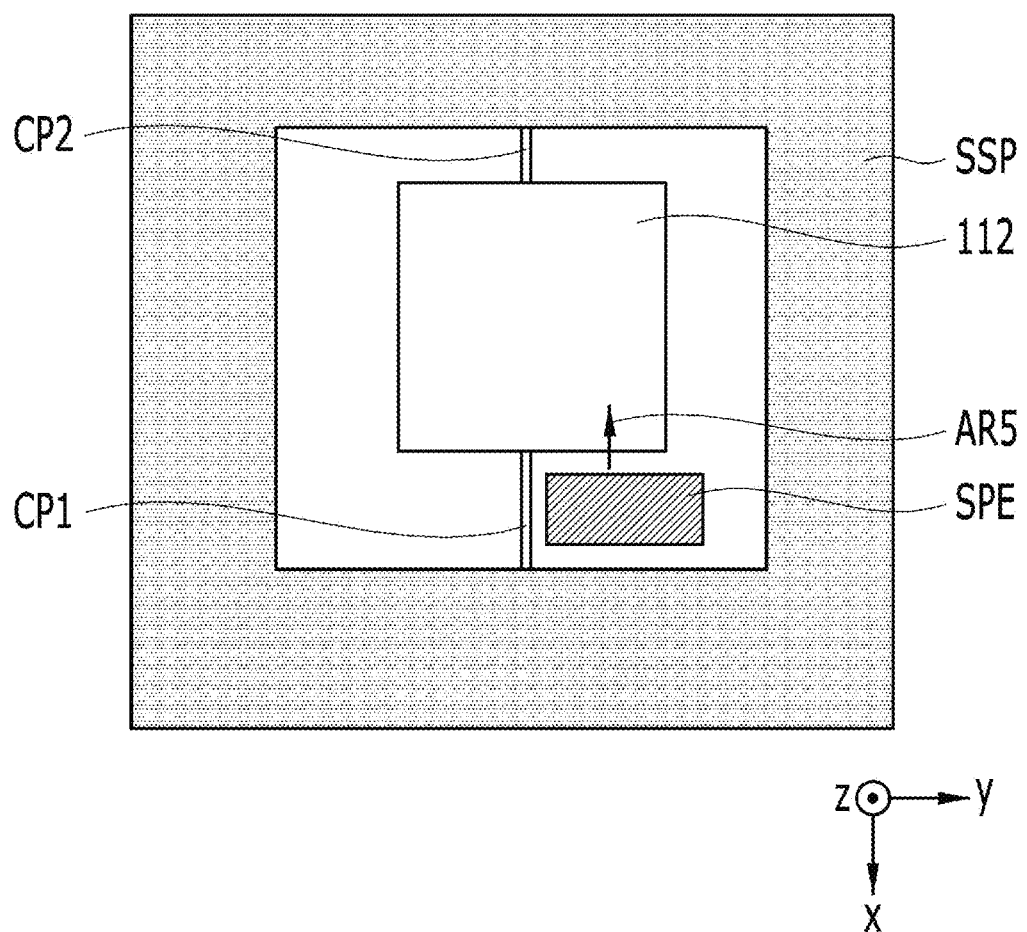
FIG. 11 illustrates a plan view of a variable filter unit according to still another embodiment.

FIG. 11 illustrates a plan view of the variable filter unit 110 according to still another embodiment.

The variable filter unit 110 shown in FIG. 11 may include a filter 112, connection parts CP1 and CP2, a body SSP, and an actuator SPE. Here, the actuator SPE is an actuator that is provided separately from the actuator 114 described above. An illustration of the above-described actuator 114 is omitted from FIG. 11.

The connection parts CP1 and CP2 may serve to mechanically connect the filter 112 to the body SSP, and may be elastic. In the case of FIG. 11, a separate actuator SPE is disposed in addition to the actuator 114 described above. The separate actuator SPE may, in response to application of operating voltage thereto, push the filter 112 in, for example, the direction indicated by the arrow AR5, thereby increasing the degree of tilting of the filter 112.

If the degree to which the filter 112 is tilted by the actuator 114 is limited, the separate actuator SPE may be used in order to amplify the degree of tilting.

Figure 12A:
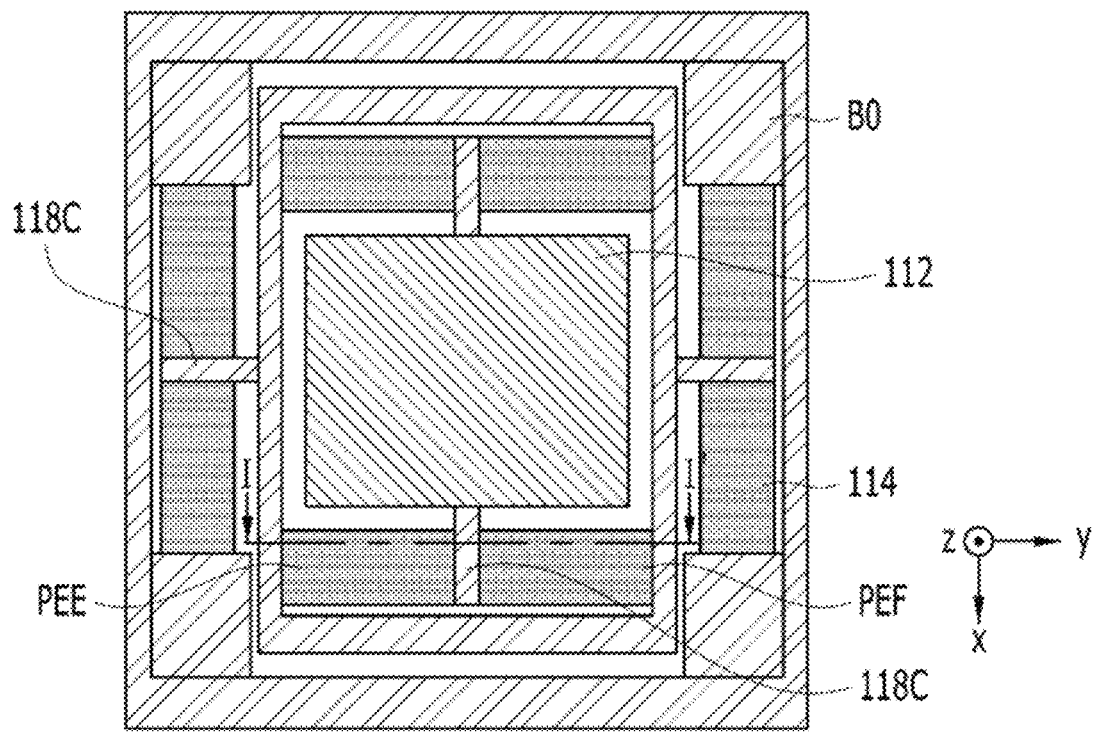
FIG. 12A illustrates a plan view of a variable filter unit according to still another embodiment.
Figure 12B:
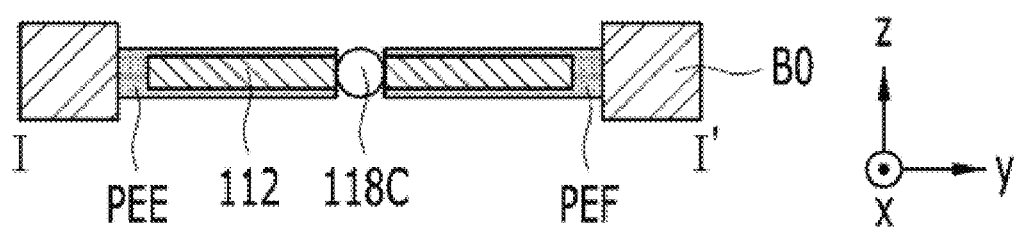
FIGS. 12B and 12C illustrate cross-sectional views taken along line I-I' shown in FIG. 12A.
Figure 12C:
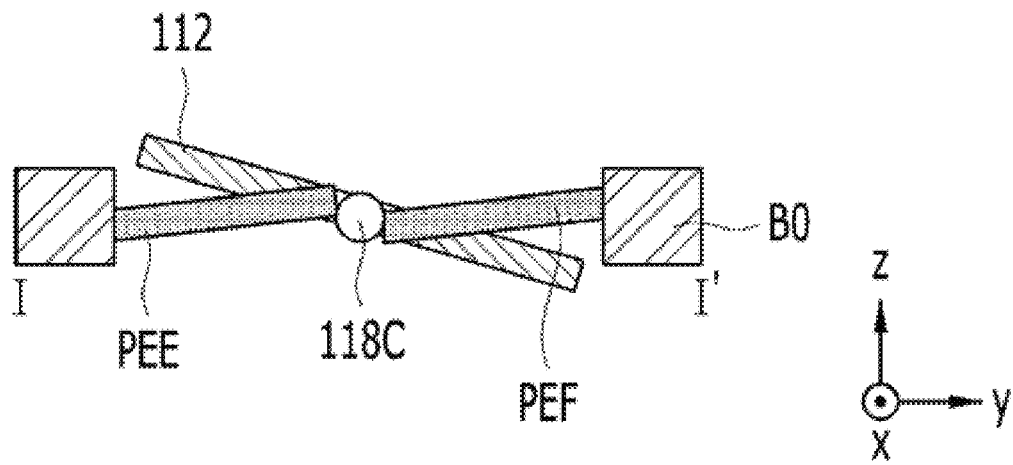

FIG. 12A illustrates a plan view of the variable filter unit 110 according to still another embodiment, and FIGS. 12B and 12C illustrate cross-sectional views taken along line I-I' shown in FIG. 12A.

The variable filter unit 110 shown in FIGS. 12A to 12C may include a body BO, a filter 112, piezoelectric elements PEE and PEF, and a central shaft part 118C.

Referring to the plan view illustrated in FIG. 12A, the body BO supports the piezoelectric elements PEE and PEF and the filter 112.

The central shaft part 118C is disposed on the rotational central axis of the filter 112 so as to rotate the filter 112 according to the change in the length of the piezoelectric elements PEE and PEF.

The piezoelectric elements PEE and PEF are disposed between the body BO and the central shaft part 118C. As shown in FIG. 12B, since there is no change in the length of the piezoelectric elements PEE and PEG in the state in which operating voltage is not applied thereto, the filter 112 is not tilted, but is positioned on a plane perpendicular to the optical axis LX.

When operating voltage is applied to at least one of the piezoelectric elements PEE and PEF, the central shaft part 118C may rotate in the clockwise or counterclockwise direction due to the change in the length of the piezoelectric element PEE or PEF to which the operating voltage is applied. The filter 112 may be tilted by rotating together with the rotation of the central shaft part 118C in the same direction. For example, referring to FIG. 12C, the filter 112 may be tilted in the clockwise direction by the piezoelectric elements PEE and PEF.

Figure 13A:
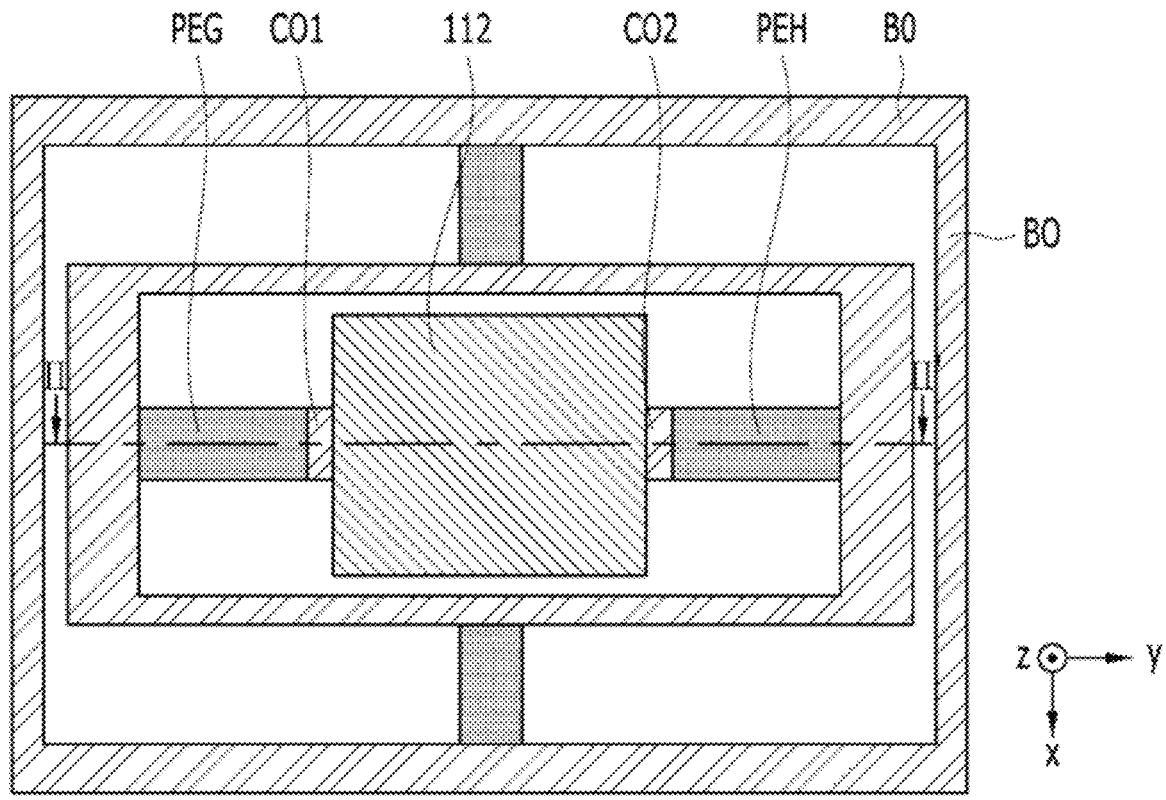
FIG. 13A illustrates a plan view of a variable filter unit according to still another embodiment.
Figure 13B:
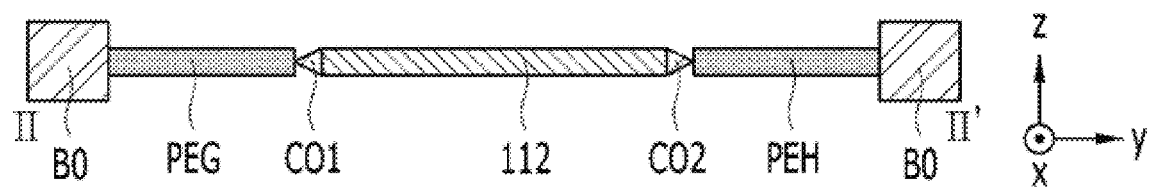
FIGS. 13B and 13C illustrate cross-sectional views taken along line II-IF shown in FIG. 13A.
Figure 13C:
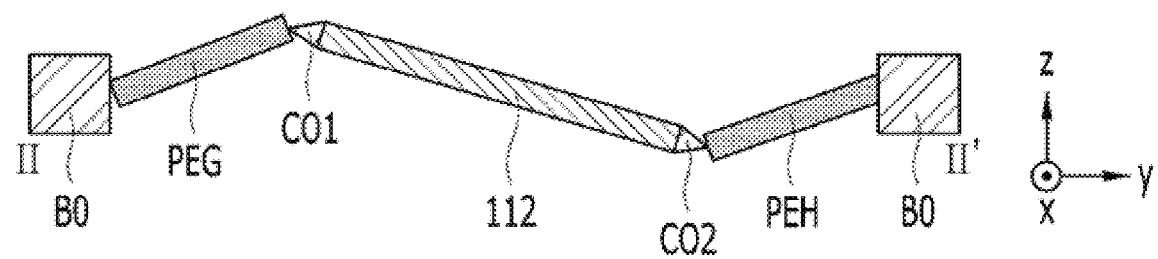

FIG. 13A illustrates a plan view of the variable filter unit 110 according to still another embodiment, and FIGS. 13B and 13C illustrate cross-sectional views taken along line II-IF shown in FIG. 13A.

The variable filter unit 110 shown in FIGS. 13A to 13C may include a body BO, a filter 112, piezoelectric elements PEG and PEH, and connection parts CO1 and CO2.

Referring to the plan view illustrated in FIG. 13A, the body BO supports the piezoelectric elements PEG and PEH.

As shown in FIG. 13A, the first connection part CO1 may be disposed between the piezoelectric element PEG and the filter 112, and the second connection part CO2 may be disposed between the piezoelectric element PEH and the filter 112.

The piezoelectric element PEG may be disposed between the body BO and the first connection part CO1, and the piezoelectric element PEH may be disposed between the body BO and the second connection part CO2.

As shown in FIG. 13B, since there is no change in the length of the piezoelectric elements PEG and PEH in the state in which operating voltage is not applied thereto, the filter 112 is not tilted, but is positioned on a plane perpendicular to the optical axis LX.

When operating voltage is applied to at least one of the piezoelectric elements PEG and PEH, the length of the piezoelectric element PEG or PEH to which the operating voltage is applied changes. When the piezoelectric element PEG or PEH, which changes in length, presses a corresponding one of the first and second connection parts CO1 and CO2, the filter 112 may rotate in the clockwise or counterclockwise direction. For example, referring to FIG. 13C, the filter 112 may be tilted in the clockwise direction by the piezoelectric elements PEE and PEF.

Hereinafter, an operation method of an embodiment of the camera module 10 (10A to 10D) described above will be described with reference to the accompanying drawings.

Figure 14:
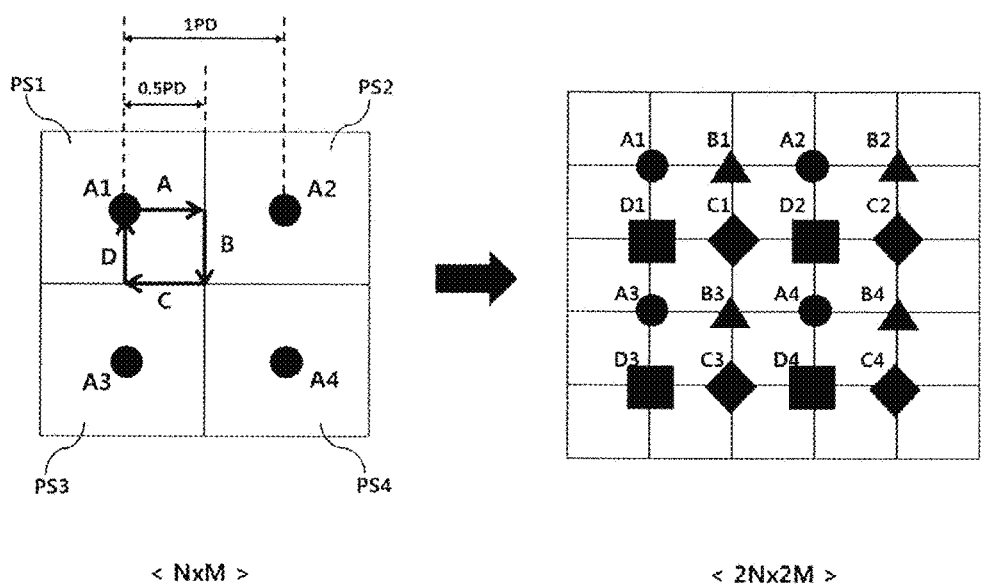
FIG. 14 is a diagram for explaining an operation method of a camera module according to an embodiment.
Figure 15:
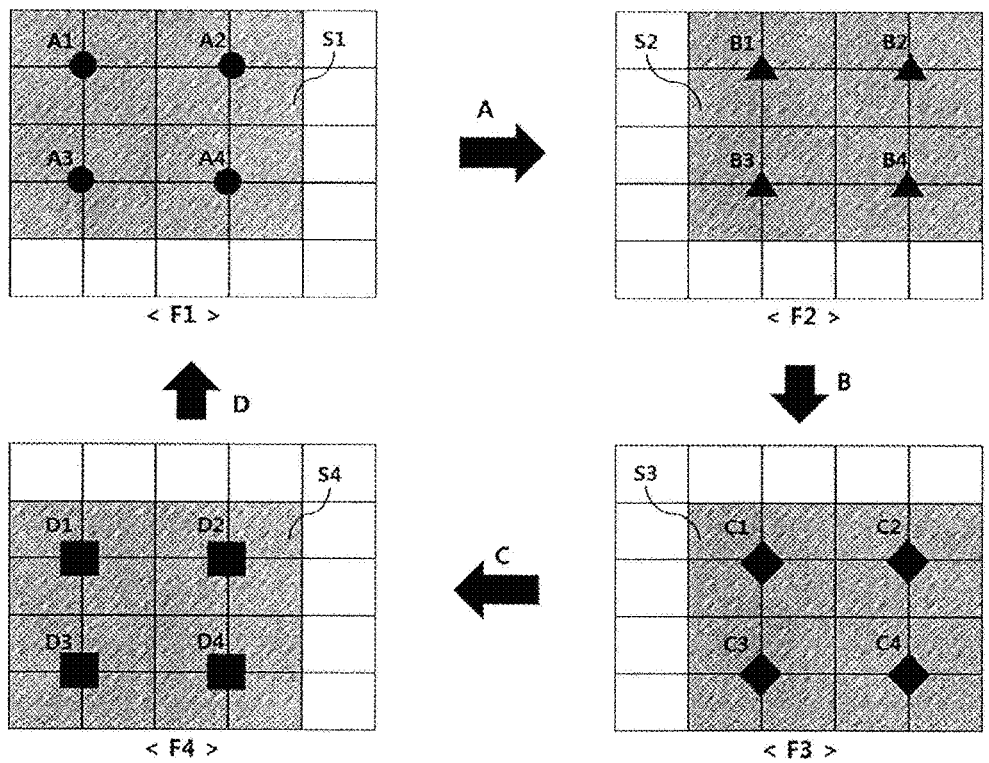
FIG. 15 is a diagram for explaining the operation method of the camera module explained in FIG. 14 in more detail.

FIG. 14 is a diagram for explaining an operation method of the camera module 10 (10A to 10D) according to an embodiment. FIG. 15 is a diagram for explaining the operation method of the camera module 10 (10A to 10D) explained in FIG. 14 in more detail.

FIG. 14 illustrates a mimetic diagram of a method of obtaining a super-resolution image by changing the optical path of light incident on the image sensor 200.

The pixel array of the image sensor 200 may include a plurality of pixels arranged in the form of an N×M matrix. For convenience of description, the following description will be made on the assumption that the pixel array includes a plurality of pixels (A1 to A4) arranged in the form of a 2×2 matrix, as shown in FIG. 14.

Each of the pixels A1 to A4 may generate image information (i.e. an analog pixel signal corresponding to the optical signal) about each of pixel scenes PS1 to PS4 using the optical signal transmitted through the lens assembly 100.

When the distance between pixels adjacent to each other in the x-axis direction (or the y-axis direction) (e.g. the distance between the centers of the pixels) is 1 pixel distance (PD), a half thereof corresponds to 0.5 PD. Hereinafter, first to fourth pixel shifts A to D will be defined.

The first pixel shift A is to shift the respective pixels A1 to A4 by 0.5 PD rightwards in the +x-axis direction, and B1 to B4 denote the pixels after completion of the first pixel shift A.

The second pixel shift B is to shift the respective pixels B1 to B4 by 0.5 PD downwards in the +y-axis direction, and C1 to C4 denote the pixels after completion of the second pixel shift B.

The third pixel shift C is to shift the respective pixels C1 to C4 by 0.5 PD leftwards in the −x-axis direction, and D1 to D4 denote the pixels after completion of the third pixel shift C.

The fourth pixel shift D is to shift the respective pixels D1 to D4 by 0.5 PD upwards in the −y-axis direction, and A1 to A4 denote the pixels after completion of the fourth pixel shift D.

Here, the pixel shift is not to shift the physical positions of the pixels of the pixel array, but is to change the travel path of light by tilting the filter 112 of the variable filter unit 110 such that a virtual pixel (e.g. B1) between two pixels (e.g. A1 and A2) may acquire a pixel scene.

Referring to FIG. 15, the respective pixels A1 to A4 may acquire a pixel scene S1, and the image sensor 200 may generate a first frame F1 from pixel signals of the respective pixels A1 to A4.

In response to the tilting control signal for changing the optical path or the FOV of the lens assembly 100 rightwards by the first angle variation $\theta I\_x$ in order to realize the first pixel shift A, the variable filter unit 110 may change the optical path or the FOV of the lens assembly 100 rightwards by the first angle variation $\theta I\_x$, whereby the first pixel shift A may be performed. Thereafter, the respective pixels B1 to B4 may acquire a pixel scene S2, and the image sensor 200 may generate a second frame F2 from pixel signals of the respective pixels B1 to B4.

In response to the tilting control signal for changing the optical path or the FOV of the lens assembly 100 downwards by the second angle variation $\theta I\_y$ in order to realize the second pixel shift B, the variable filter unit 110 may change the optical path or the FOV of the lens assembly 100 downwards by the second angle variation $\theta I\_y$, whereby the second pixel shift B may be performed. Thereafter, the respective pixels C1 to C4 may acquire a pixel scene S3, and the image sensor 200 may generate a third frame F3 from pixel signals of the respective pixels C1 to C4.

In response to the tilting control signal for changing the optical path or the FOV of the lens assembly 100 leftwards by the first angle variation $\theta I\_x$ in order to realize the third pixel shift C, the variable filter unit 110 may change the optical path or the FOV of the lens assembly 100 leftwards by the first angle variation $\theta I\_x$, whereby the third pixel shift C may be performed. Thereafter, the respective pixels D1 to D4 may acquire a pixel scene S4, and the image sensor 200 may generate a fourth frame F4 from pixel signals of the respective pixels D1 to D4.

In response to the tilting control signal for changing the optical path or the FOV of the lens assembly 100 upwards by the second angle variation $\theta I\_y$ in order to realize the fourth pixel shift D, the variable filter unit 110 may change the optical path or the FOV of the lens assembly 100 upwards by the second angle variation $\theta I\_y$, whereby the fourth pixel shift D may be performed. Thereafter, the respective pixels A1 to A4 may acquire a pixel scene S1, and the image sensor 200 may generate a fifth frame F5 from pixel signals of the respective pixels A1 to A4. Subsequently, the pixel shift and the generation of the frame through the shifted pixels may be repeatedly performed.

Here, each of the first angle variation $\theta I\_x$ and the second angle variation $\theta I\_y$ may store information related to the extent to which the optical path is changed so that the pixels are shifted by 0.5 PD, and may be calculated in advance based on the first FOV angle Fx and the second FOV angle Fy and may be stored (e.g. by the image sensor 200, the image synthesizer 300, or the controller 400).

The image sensor 200 may include a first region and a second region, and the controller 400 may output a first path control signal as the control signal to control the variable filter unit 110 such that the optical path of light, which is incident from the outside and passes through the variable filter unit 110, is changed from the first region to the second region of the image sensor 200.

In addition, the image sensor 200 may further include a third region and a fourth region, and the controller 400 may output a second path control signal as the control signal to control the variable filter unit 110 such that the optical path is changed from the second region to the third region of the image sensor 200, and may output a third path control signal as the control signal to control the variable filter unit 110 such that the optical path is changed from the third region to the fourth region.

Here, the first, second and third path control signals may correspond to the first signal shown in FIG. 1.

The first signal may include a signal for changing the FOV of the lens assembly 100 in a first direction, a signal for changing the FOV of the lens assembly 100 in a second direction, a signal for changing the FOV of the lens assembly 100 in a third direction, and a signal for changing the FOV of the lens assembly 100 in a fourth direction.

The image synthesizer 300 may synthesize the first to fourth frames and may generate an image acquired by a 2N×2M pixel array rather than by an N×M pixel array. As a method in which the image synthesizer 300 synthesizes the first to fourth frames, a method of simply merging the first to fourth frames according to the positions of the respective pixels (e.g. in the case of the first row, generating one frame by arranging the pixel signal of A1, the pixel signal of B1, the pixel signal of A2, and the pixel signal of B2) or a method of correcting the pixel signal of any one pixel (e.g. C1) using the pixel signals of the pixels adjacent thereto (e.g. A1, B1, A2, D1, D2, A3, B3, and A4) based on the principle in which the pixel scenes of adjacent pixels overlap each other may be used. However, the scope of the embodiment is not limited thereto. Any of various methods of generating a super-resolution image may be used. The image synthesizer 300 may be referred to as a postprocessor. The postprocessor may generate a first super-resolution image frame by synthesizing the first to fourth image frames transmitted from the image sensor 200, and may then generate a second super-resolution image frame by synthesizing the fifth image frame and the second to fourth image frames output from the image sensor 200.

According to the operation method of the camera module 10 (10A to 10D) shown in FIGS. 14 and 15, an image having a quadruple resolution may be generated by synthesizing a plurality of frames acquired through pixel shift.

Figure 16:
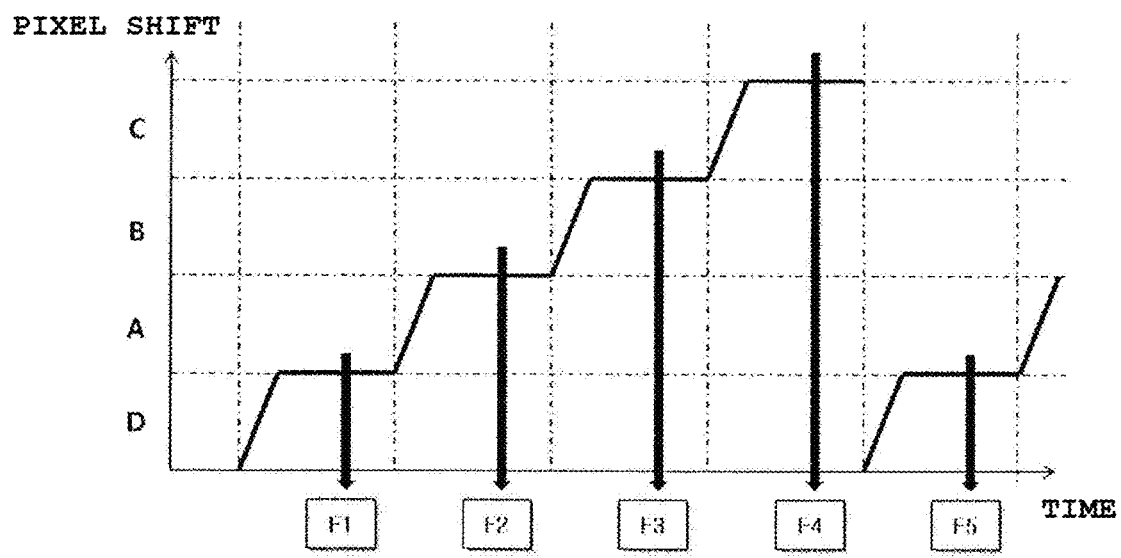
FIG. 16 is a timing diagram of an operation method of a camera module according to an embodiment.

FIG. 16 is a timing diagram of the operation method of the camera module 10 (10A to 10D) according to an embodiment.

Referring to FIG. 16, in response to the tilting control signal for changing the optical path or the FOV of the lens assembly 100 upwards by the second angle variation $\theta I\_y$, the variable filter unit 110 may perform the fourth pixel shift D to change the optical path or the FOV of the lens assembly 100 upwards by the second angle variation $\theta I\_y$. In some embodiments, the controller 400 may transmit a feedback signal, which indicates that the fourth pixel shift D has been completed by the variable filter unit 110 in response to the first signal, to the image sensor 200. In this case, the controller 400 may determine the completion of the fourth pixel shift D through a response signal from the variable filter unit 110 or a separate timer. The respective pixels A1 to A4 of the image sensor 200 that receives the feedback signal may acquire the pixel scene S1, and the image sensor 200 may generate the first frame F1 from the pixel signals of the respective pixels A1 to A4.

In response to the first signal for changing the optical path or the FOV of the lens assembly 100 rightwards by the first angle variation $\theta I\_x$, the variable filter unit 110 may perform the first pixel shift A to change the optical path or the FOV of the lens assembly 100 rightwards by the first angle variation $\theta I\_x$. In some embodiments, the controller 400 may transmit a feedback signal, which indicates that the first pixel shift A has been completed by the variable filter unit 110 in response to the first signal, to the image sensor 200. In this case, the controller 400 may determine completion of the first pixel shift A through a response signal from the variable filter unit 110 or a separate timer. The respective pixels B1 to B4 of the image sensor 200 that receives the feedback signal may acquire the pixel scene S2, and the image sensor 200 may generate the second frame F2 from the pixel signals of the respective pixels B1 to B4.

In response to the tilting control signal for changing the optical path or the FOV of the lens assembly 100 downwards by the second angle variation $\theta I\_y$, the variable filter unit 110 may perform the second pixel shift B to change the optical path or the FOV of the lens assembly 100 downwards by the second angle variation $\theta I\_y$. In some embodiments, the controller 400 may transmit a feedback signal, which indicates that the second pixel shift B has been completed by the variable filter unit 110 in response to the tilting control signal, to the image sensor 200. In this case, the controller 400 may determine completion of the second pixel shift B through a response signal from the variable filter unit 110 or a separate timer. The respective pixels C1 to C4 of the image sensor 200 that receives the feedback signal may acquire the pixel scene S3, and the image sensor 200 may generate the third frame F3 from the pixel signals of the respective pixels C1 to C4.

In response to the tilting control signal for changing the optical path or the FOV of the lens assembly 100 leftwards by the first angle variation $\theta I\_x$, the variable filter unit 110 may perform the third pixel shift C to change the optical path or the FOV of the lens assembly 100 leftwards by the first angle variation $\theta I\_x$. In some embodiments, the controller 400 may transmit a feedback signal, which indicates that the third pixel shift C has been completed by the variable filter unit 110 in response to the tilting control signal, to the image sensor 200. In this case, the controller 400 may determine completion of the third pixel shift C through a response signal from the variable filter unit 110 or a separate timer. The respective pixels D1 to D4 of the image sensor 200 that receives the feedback signal may acquire the pixel scene S4, and the image sensor 200 may generate the fourth frame F4 from the pixel signals of the respective pixels D1 to D4.

Thereafter, in response to the tilting control signal for changing the optical path or the FOV of the lens assembly 100 upwards by the second angle variation $\theta I\_y$, the variable filter unit 110 may perform the fourth pixel shift D to change the optical path or the FOV of the lens assembly 100 upwards by the second angle variation $\theta I\_y$. In some embodiments, the controller 400 may transmit a feedback signal, which indicates that the fourth pixel shift D has been completed by the variable filter unit 110 in response to the tilting control signal, to the image sensor 200. In this case, the controller 400 may determine completion of the fourth pixel shift D through a response signal from the variable filter unit 110 or a separate timer. The respective pixels A1 to A4 of the image sensor 200 that receives the feedback signal may acquire the pixel scene S1, and the image sensor 200 may generate the fifth frame F5 from the pixel signals of the respective pixels A1 to A4. Subsequently, the pixel shift and the generation of the frame through the shifted pixels may be repeatedly performed.

In particular, referring to FIG. 16, the controller 400 may transmit the tilting control signal when generation of the image frame by the image sensor 200 is completed and the image sensor 200 transmits a synchronization signal, which instructs transmission of the tilting control signal to the variable filter unit 110, thereto. That is, a series of operations including the pixel shift, the generation of the frame, and the subsequent pixel shift may be performed through transmission and reception of the first signal and the second signal and synchronization thereof.

Figure 17:
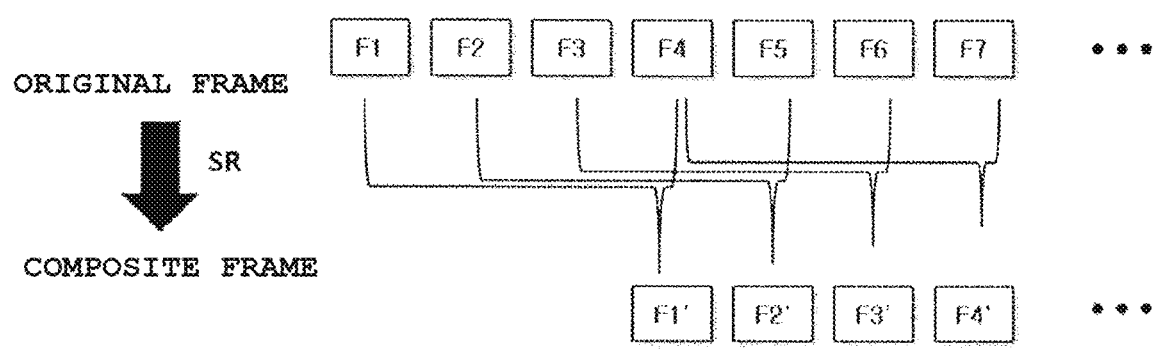
FIG. 17 is a diagram illustrating an example of a frame synthesis method of a camera module according to an embodiment.

FIG. 17 is a diagram illustrating an example of a frame synthesis method of the camera module 10 (10A to 10D) according to an embodiment.

Referring to FIG. 17, it is assumed that the image sensor 200 sequentially generates the first to seventh frames F1 to F7 according to the sequential pixel shifts A to D.

The image synthesizer 300 may sequentially receive the frames, and may generate a composite frame, which is a super-resolution image, through synthesis of the super-resolution (SR) image.

In this case, as shown in FIG. 17, the image synthesizer 300 may receive the first to fourth frames F1 to F4, and may generate a first composite frame F1'. Thereafter, the image synthesizer 300 may receive the second to fifth frames F2 to F5, and may generate a second composite frame F2'. Thereafter, the image synthesizer 300 may receive the third to sixth frames F3 to F6, and may generate a third composite frame F3'. Thereafter, the image synthesizer 300 may receive the fourth to seventh frames F4 to F7, and may generate a fourth composite frame F4' through a super-resolution image generation algorithm.

Here, the image synthesizer 300 may sequentially receive the first to seventh frames F1 to F7 from the image sensor 200, and may store three frames preceding the frame that is currently input thereto in order to generate a composite frame. In some embodiments, a buffer for storing the frames may have a storage capacity capable of storing at least three frames.

If a composite frame is generated using the first to fourth frames and thereafter a composite frame is generated using the fifth to eighth frames, the frame rate may be reduced to ¼ of the original frame rate. However, according to the method of the embodiment, composite frames are successively generated using the current frame and three frames preceding the current frame that are sequentially input, thereby inhibiting deterioration in frame rate.

In the embodiments described above, the method of generating a super-resolution image having a quadruple resolution through four pixel shifts has been described, but the scope of the disclosure is not limited thereto. A super-resolution image having a higher resolution may be generated through any of other pixel shift methods.

Hereinafter, a super-resolution image generation method performed by the above-described camera module 10 (10A to 10D) will be described.

The super-resolution image generation method may include a step of outputting a first image frame, a step of generating a second image frame, which is moved by a first distance in a first direction from the first image frame, a step of generating a third image frame, which is moved by the first distance in a second direction from the second image frame, a step of generating a fourth image frame, which is moved by the first distance in a third direction from the third image frame, and a step of synthesizing the first image frame to the fourth image frame to generate a composite image. The composite image generated through this method may have a higher resolution than a plurality of image frames.

In general, a camera module has a resolution equivalent to the physical resolution of an image sensor. In order to overcome this limitation, it is possible to realize a higher resolution through an algorithm or signal processing.

As another method of realizing a high resolution, information obtained using a plurality of cameras may be combined, or a main body of one camera may be physically scanned in order to obtain a resolution exceeding the physical resolution of an image sensor. However, in the case of using a plurality of cameras, there is a limitation in that it is difficult to combine disparate pieces of information due to the difference in the physical position between the cameras. Further, in the case of physically scanning a main body of a camera, there is a limitation in that it is difficult to precisely control the posture of the camera and combine acquired images.

On the other hand, according to the embodiments, the image sensor 200 secures data, which is shifted by a subpixel, by controlling the tilting of the filter 112 to change the optical path, whereby a resolution higher than the physical resolution of the image sensor may be obtained using only one camera. That is, it is possible to obtain a high-resolution image without requiring a plurality of cameras or controlling the main body of a camera. Accordingly, in the camera module 10 (10A to 10D) according to the embodiments, high computational complexity required to obtain a super-resolution image may be solved by a hardware-based method using the variable filter unit 110.

In addition, composite frames may be successively generated with respect to the current frames that are sequentially input, thereby inhibiting deterioration in frame rate.

The above description may also be applied to a distance or depth measurement device using time of flight (ToF). In particular, the resolution of a ToF sensor is generally lower than that of a commonly used image sensor. Therefore, if the super-resolution image generation method described above is used to implement facial recognition, object recognition, depth extraction, contour recognition, or the like using a ToF sensor, significantly improved effects may be obtained.

Although only a limited number of embodiments have been described above, various other embodiments are possible. The technical contents of the above-described embodiments may be combined into various forms as long as they are not incompatible with one another, and thus may be implemented in new embodiments.

For example, an optical device (or an optical instrument) including the above-described camera module 10 (10A to 10D) may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include at least one of a solid lens or a liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A camera module according to embodiments may be used in camera/video devices, telescopic devices, microscopic devices, an interferometer, a photometer, a polarimeter, a spectrometer, a reflectometer, an auto-collimator, a lensmeter, a smartphone, a laptop computer, a tablet computer, etc.

The invention claimed is:

1. A camera module, comprising:
an image sensor configured to output a plurality of image frames;
a lens assembly disposed on the image sensor,
wherein the lens assembly comprises:
   at least one lens unit;
   a holder holding the at least one lens unit disposed on an optical path; and
   a variable filter unit configured to perform a pixel shift in response to a control signal to adjust the optical path of light incident on the image sensor,
   wherein the variable filter unit comprises:
      a filter configured to filter light within a predetermined wavelength range, the filter and the at least one lens unit being separately held by the holder; and
      an actuator configured to adjust an angle of the filter with respect to an optical axis of the at least one lens unit in response to the control signal, thereby changing the optical path,
   wherein the changing the optical path includes changing an angle of a field of view of an optical signal or a direction of the field of view,
   wherein the plurality of image frames comprises image frames generated along respectively different optical paths changed by the variable filter unit, and
   wherein the image sensor generates an image frame when the pixel shift has been performed by the variable filter unit;
a controller configured to generate the control signal; and
an image synthesizer configured to generate a composite image,
wherein the composite image has a resolution N (N is a positive integer greater than or equal to 4) times higher than that of each of the plurality of image frames,
wherein the image synthesizer sequentially receives the image frames from the image sensor, and
wherein the image synthesizer is configured to successively generate a plurality of composite images by generating a composite image, when a current image frame is received, based on the current image frame that is currently received from the image sensor thereto and N−1 image frames received immediately before the current image frame.

2. The camera module according to claim 1,
wherein the variable filter unit comprises a support member disposed on the holder to support the filter and the actuator.

3. The camera module according to claim 2,
wherein the lens assembly comprises a lens barrel including a space formed therein to accommodate the at least one lens unit, and
wherein the support member has a cross-sectional shape that protrudes from an inner surface of the lens barrel above the at least one lens unit.

4. The camera module according to claim 1,
wherein the at least one lens unit comprises a plurality of lens units, and
wherein the variable filter unit comprises a support member disposed between the plurality of lens units to support the filter and the actuator.

5. The camera module according to claim 4,
wherein the lens assembly comprises a lens barrel including a space formed therein to accommodate the plurality of lens units, and
wherein the support member has a cross-sectional shape that protrudes from an inner surface of the lens barrel between the lens units.

6. The camera module according to claim 1, comprising:
a main board on which the image sensor is disposed,
wherein the holder is configured to accommodate and support the at least one lens unit.

7. The camera module according to claim 6,
wherein the variable filter unit comprises a support member having a cross-sectional shape that protrudes from an inner surface of the holder under the at least one lens unit, the support member supporting the filter and the actuator.

8. The camera module according to claim 1,
wherein the actuator comprises a plurality of first piezoelectric elements disposed on respective corners of the filter and configured to operate independently of each other.

9. The camera module according to claim 1,
wherein the actuator comprises a plurality of second piezoelectric elements disposed closer to a tilting axis of the filter than to corners of the filter while being spaced apart from each other and configured to operate independently of each other.

10. The camera module according to claim 1, wherein the actuator comprises:
a third piezoelectric element disposed on a first edge of the filter; and
a fourth piezoelectric element disposed on a second edge of the filter, the second edge being opposite the first edge,
wherein the third piezoelectric element and the fourth piezoelectric element are configured to operate independently of each other.

11. The camera module according to claim 1,
wherein the image sensor comprises a first region and a second region, and wherein the controller outputs a first path control signal as the control signal to control the variable filter unit such that an optical path of incident light, passing through the variable filter unit, is changed from the first region to the second region of the image sensor.

12. The camera module according to claim 11,
wherein the image sensor comprises a third region and a fourth region, and
wherein the controller outputs a second path control signal as the control signal to adjust the variable filter unit such that an optical path is changed from the second region to the third region, and outputs a third path control signal as the control signal to adjust the variable filter unit such that an optical path is changed from the third region to the fourth region.

13. The camera module according to claim 1,
wherein the plurality of image frames comprises:
   a first image frame; and
   a second image frame shifted by a first interval based on the first image frame.

14. The camera module according to claim 1,
wherein the control signal comprises:
   a signal changing a field of view of the lens assembly in a first direction;
   a signal changing the field of view of the lens assembly in a second direction;
   a signal changing the field of view of the lens assembly in a third direction; and
   a signal changing the field of view of the lens assembly in a fourth direction.

15. The camera module according to claim 1,
wherein the controller receives a signal indicating completion of generation of one of the plurality of image frames, and transmits the control signal to the variable filter unit to adjust the optical path.

16. The camera module according to claim 1,
wherein the variable filter unit comprises:
   the filter;
   a central shaft part disposed on a tilting shaft of the filter; and
   piezoelectric elements connected to respective end portions of the central shaft part.

17. The camera module according to claim 1,
wherein the variable filter unit comprises:
   a body;
   the filter;
   a central shaft part disposed between the body and the filter; and
   a piezoelectric element disposed between the body and the central shaft part,
   wherein the body supports the piezoelectric element and the filter, and
   wherein the central shaft part is disposed on a rotational central axis of the filter so as to rotate the filter according to a change in a length of the piezoelectric element.

18. The camera module according to claim 1,
wherein the variable filter unit comprises:
   a body;
   the filter;
   piezoelectric elements supported by the body; and
   connection parts disposed between the piezoelectric elements and the filter.

* * * * *